United States Patent
Price

(10) Patent No.: US 12,465,528 B2
(45) Date of Patent: Nov. 11, 2025

(54) DEPLOYMENT DEVICE FOR AN INSERTABLE AND ASSOCIATED METHODS

(71) Applicant: MEDITATI PTY LTD, Paddington (AU)

(72) Inventor: Tonia Price, Paddington (AU)

(73) Assignee: MEDITATI PTY LTD, Paddington (AU)

( * ) Notice: Subject to any disclaimer, the term of this patent is extended or adjusted under 35 U.S.C. 154(b) by 111 days.

(21) Appl. No.: 17/998,674

(22) PCT Filed: May 25, 2021

(86) PCT No.: PCT/AU2021/000037
§ 371 (c)(1),
(2) Date: Nov. 14, 2022

(87) PCT Pub. No.: WO2021/237269
PCT Pub. Date: Dec. 2, 2021

(65) Prior Publication Data
US 2023/0310223 A1    Oct. 5, 2023
US 2025/0032327 A2    Jan. 30, 2025

(30) Foreign Application Priority Data

May 25, 2020 (AU) .............................. 2020901683

(51) Int. Cl.
*A61F 13/26* (2006.01)
*A61M 31/00* (2006.01)

(52) U.S. Cl.
CPC ............ *A61F 13/266* (2013.01); *A61F 13/26* (2013.01); *A61M 31/00* (2013.01); *A61M 2205/586* (2013.01)

(58) Field of Classification Search
CPC .......... A61F 13/266; A61F 13/26; A61F 6/12; A61M 31/00
See application file for complete search history.

(56) References Cited

U.S. PATENT DOCUMENTS 3,358,686 A * 12/1967 Asaka .................... A61F 13/26
                                                                604/14
3,749,093 A     7/1973 Bloom
(Continued)

FOREIGN PATENT DOCUMENTS

EP     0064747 A2 * 11/1982  ............ A61M 31/00
EP     1639974 A1 *  3/2006  ............ A61F 13/202
(Continued)

OTHER PUBLICATIONS

European Search Report and Opinion for Application No. 21812588.8 dated May 8, 2024, 4 pages.
(Continued)

*Primary Examiner* — Susan S Su
(74) *Attorney, Agent, or Firm* — TraskBritt

(57) ABSTRACT

The present invention is directed to delivery device for deploying an insertable into an orifice guided by digit, the delivery device comprising: insertable orientation means adapted to orient the insertable in a deployment orientation and digit orientation means adapted to orient a portion of at least one digit in a navigation orientation, the insertable orientation means and the digit orientation means adjoined across a partition with a partition cross-section, and the deployment orientation and the navigation orientation arranged for digit guided deployment of the insertable into the orifice. Also disclosed is a method of deploying an insertable into an orifice guided by digit, using the delivery device of the present invention. The delivery device and method of the present invention are well suited to deploying tampons into the vaginal cavity.

20 Claims, 12 Drawing Sheets

(56) References Cited

U.S. PATENT DOCUMENTS

| | | | |
|---|---|---|---|
| 4,286,594 | A | 9/1981 | Cunningham |
| 5,213,566 | A | 5/1993 | Weissenburger |
| 2002/0107497 | A1 | 8/2002 | Osborn, III et al. |
| 2014/0303545 | A1* | 10/2014 | Abdon .................. A61F 13/266 604/14 |

FOREIGN PATENT DOCUMENTS

| | | | |
|---|---|---|---|
| RU | 94001178 | A1 | 4/1996 |
| WO | 1982002489 | A1 | 8/1982 |
| WO | 2005/058218 | A1 | 6/2005 |
| WO | 2006086849 | A1 | 8/2006 |
| WO | 2006/123132 | A1 | 11/2006 |
| WO | 2018102155 | A1 | 6/2018 |

OTHER PUBLICATIONS

International Search Report for International Application No. PCT/AU2021/000037, mailed Jul. 23, 2021, 7 pages.

International Written Opinion for International Application No. PCT/AU2021/000037, mailed Jul. 23, 2021, 7 pages.

Israelian Office Action for Application No. 298119 dated Sep. 21, 2023, 6 pages.

Odani et al., Incidence and Relative Risk of Metachronous Second Primary Cancers for 16 Cancer Sites, Osaka, Japan, 2000-2015 Population-Based Analysis, Cancer Medicine, (Aug. 2021), vol. 11, No. 2, pp. 507-519.

Russian Office Action for Application No. 2022127892/03(061243) dated Sep. 6, 2024, 7 pages.

Sun et al., Urinary tract infection increases subsequent urinary tract cancer risk: A population-based cohort study, (Feb. 14, 2013), https://onlinelibrary.wiley.com/doi/abs/10.1111/cas. 12127.

U.S. Food & Drug Administration, "Sterilization for Medical Devices", Food and Drug Administration, last updated Nov. 26, 2024, <URL: https://www.fda.gov/medical-devices/general-hospital-devices-and-supplies/sterilization-medical-devices> (14 pages).

* cited by examiner

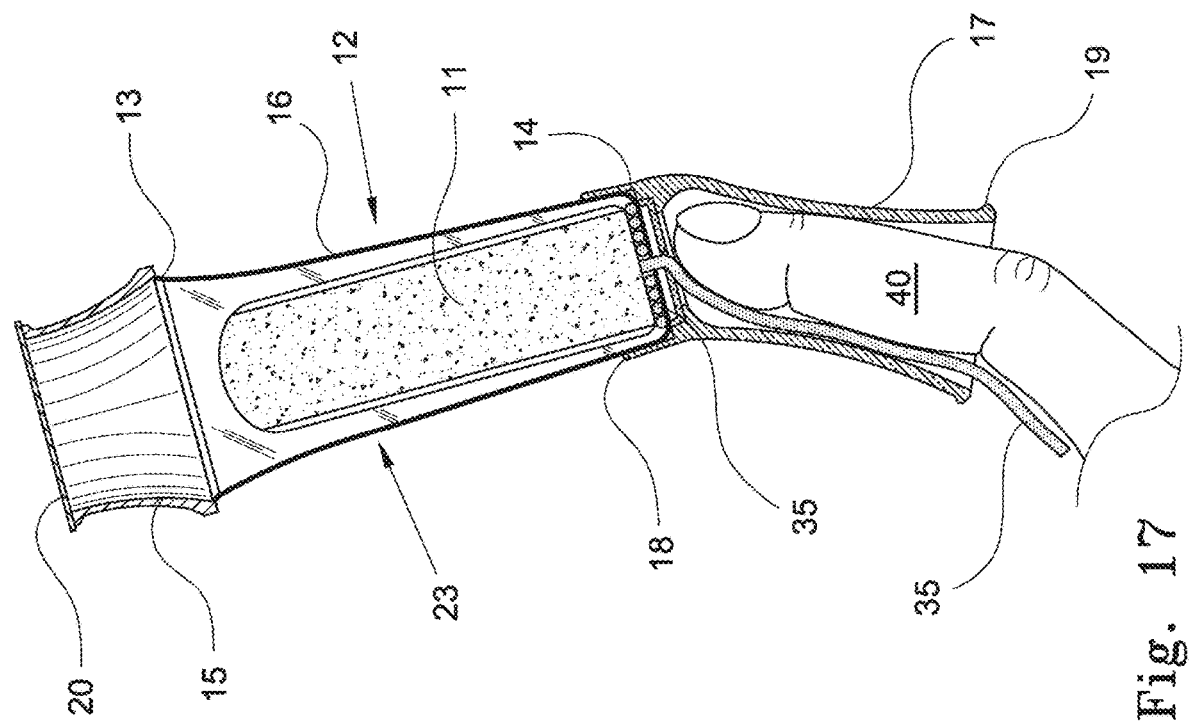
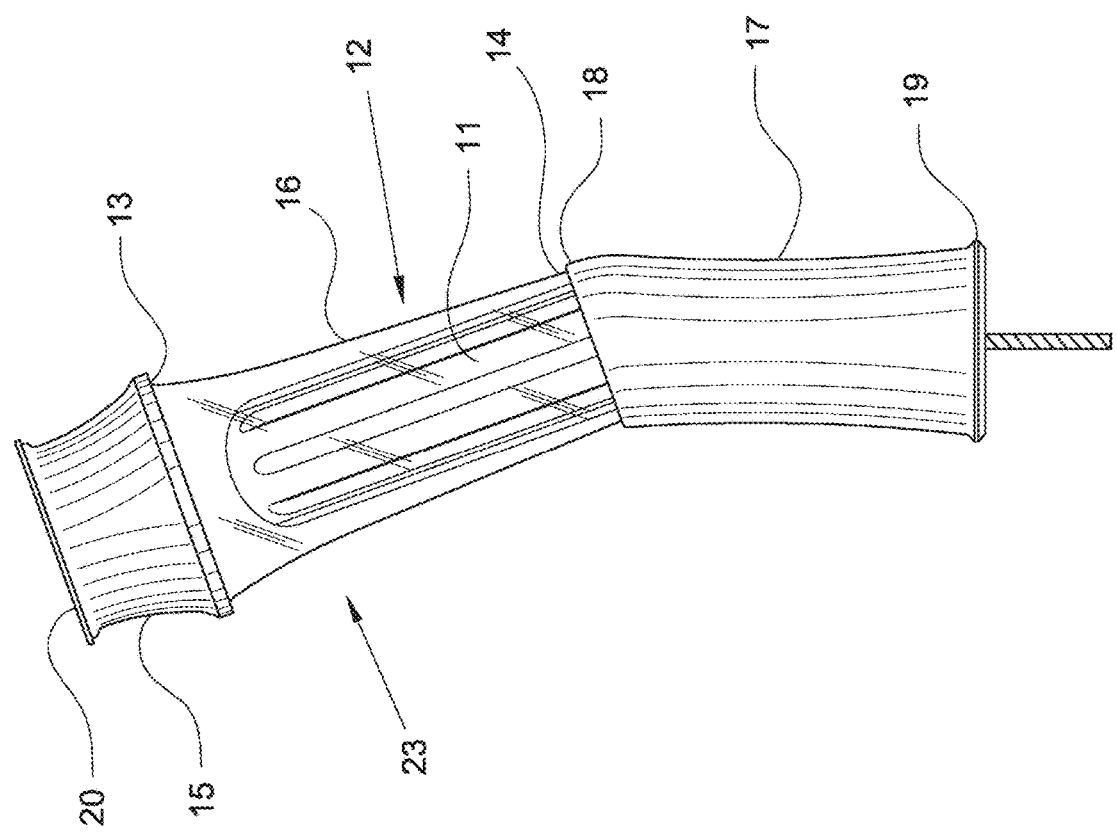

DEPLOYMENT DEVICE FOR AN INSERTABLE AND ASSOCIATED METHODS

TECHNICAL FIELD

The present invention relates to devices for deploying an insertable into an orifice. Specifically, the invention relates to devices for deploying an insertable into an orifice guided by digit.

BACKGROUND

The insertion of a variety of insertables into orifices, such as the vaginal orifice or anus, for treatment and/or diagnosis of a variety of conditions, and for a variety of other purposes, is to known. For example, tampons are used by females during their menstrual period to absorb menstrual fluid and the like. The use of tampons can be associated with significant risk of infection and disease. For example, urinary tract infections have been linked to a higher risk of developing urinary tract cancers (Japanese Cancer Association https://onlinelibrary.wiley.com/doi/full/10.1111/cas.12127). This can be precipitated by poor hygiene control during tampon insertion and/or removal.

There are essentially two modes of inserting tampons that are currently in use. The first mode is via direct digital insertion. The user inserts the tampon into the vagina with a finger(s). This can be unhygienic and invasive and, in some instances, an embarrassing procedure for a user, particularly when in public facilities. For the uninitiated, i.e. females who have just started experiencing a period, the procedure can be tricky and painful. The contact between the finger and the vaginal wall may potentially result in foreign microorganisms being introduced into the vagina, together with an increased likelihood of the procedure soiling the inserter's fingers.

There can be lack of basic hygiene when items such as digitally insertable tampons are inserted or removed. Visible blood can remain on the fingers of a user which can be transferred to doors, taps and the like, which is unhygienic and unpleasant for the next user.

The second current mode of inserting tampons is via an applicator which is typically made from cardboard, plastic material or organic materials. Tampon applicators currently on the market are generally considered to provide for a more hygienic process than digital insertion. Furthermore, tampon applicators are sometimes considered to make insertion of the tampon more reliable and correct.

The problems with current tampon applicators include that they are difficult to handle (often requiring multiple movable parts) and require relatively bulky packaging. Further, tampon applicators can cause pinching of the vaginal wall. Tampon applicators are invasive and have a significant environmental impact upon disposal. Blood soiled applicators are also a biological hazard. Given their typical length, tampon applicators are more conspicuous and more difficult to be transported and handled in a discreet manner. Furthermore, the tampon encased within the many tampon applicators cannot be inspected prior to insertion which has been known to result in a user inserting an unsanitary tampon. Tampon applicators may also require some manual dexterity to operate, which can be particularly challenging for new and inexperienced users, and for people with physical disabilities.

Suppositories are recognised as accepted alternative formulations for pharmaceutical delivery. Vaginal suppositories are also used to administer vaginal contraceptives, pain relief and to treat various gynaecological conditions. As with tampons, digital insertion is often used to insert a suppository or pessary and carries similar biological hazard risks, and some or all of the other difficulties identified above associated with digital insertion of tampons.

WO 2006/086849 discloses an insertable member for digital insertion into an orifice of a human or animal, which may be used to insert a tampon. The insertion member comprises an elongate insertion body to be received within the orifice and a sheath member which is detachably connected to at least a portion of the elongate insertion body. The sheath member is moveable relative to the elongate insertion body between a first configuration and a second configuration such that when the sheath member is in the second configuration, the sheath member is dimensioned to receive at least part of one or more digits of a user. The sheath member contains a tampon, suppository, tablet, or pessary and is hygienically sealed at the top end. However, this invention was found not to allow for a secure finger hold.

WO2005/058218 and WO2006/123132 disclose sanitary products for use by women for the absorption of menstrual fluid comprising a plug (which is the word used in both specifications to reference a tampon) and a pad joined by a sheath. In situ, when the plug is in the vagina cavity, the pad remains outside the vagina, but has an absorbent layer on an inward side proximal to the plug and a liquid impermeable layer on an outward side. The sheath can comprise a tube of absorbent material for drawing excess menstrual fluid from the plug to the pad and has a layer of liquid impermeable material on its inside surface. A string is provided that extends inside the sheath from the outward end of the plug to aid removal of the product.

In use of the invention disclosed in WO2005/058218 and WO2006/123132, a wearer can insert a finger into the sheath from the outward side of the pad to assist with insertion of the plug into the vaginal cavity. In that configuration, a proximal portion of the plug touches the tip of the user's finger, unless in an embodiment wherein the thin film surrounding the proximal portion of the plug is substantially interposed between the tip of the user's finger and the proximal portion of the plug. In those embodiments, the film surrounding the proximal portion of the plug is so thin that a user nevertheless feels as though she is touching the proximal end of the plug. However, the combination of plug and pad can be bulky and obtrusive to insert and place and also to remove and dispose of. Although both patent specifications indicate that the pad can be moved away from the urethral opening so the pad is not soiled by urine during micturition, the practical reality is that the pad is likely to be exposed to urine irrespective.

Another significant issue for tampon applicator products is an inability to dispose of a used applicator by flushing down the toilet, because current applicators are not currently manufactured using dissolvable or flushable materials. Applicators that are not made from dissolvable material, but are nonetheless flushed down a toilet, can cause significant damage and blockage in sewerage system pipes.

WO 2018/102155 A1 to Kimberly-Clark Worldwide, Inc. discloses a flushable tampon applicator product that includes an outer tube for housing a tampon; an inner tube, at least a portion of which extends into the outer tube, wherein the outer tube includes an outer, body-contacting surface, wherein the inner tube is moveable relative to the outer tube and configured to expel a tampon from the outer tube, and wherein at least one of the outer tube and the inner tube comprises a thermoplastic composition including partiallyhydrolyzed polyvinyl alcohol (PVOH), polyethylene glycol (PEG), a plasticizer, and a hydrophobic polymeric component. However, such barrel tampon applicators can be awkward and obtrusive to use, and difficult for young and inexperienced users, or people with physical disabilities, as it is difficult to determine as to whether placement is correct.

There is a need for improved devices to deploy insertables into an orifice.

Any reference to or discussion of any document, act or item of knowledge in this specification is included solely for the purpose of providing a context for the present invention. It is not suggested or represented that any of these matters or any combination thereof, formed at the priority date, part of the common general knowledge, or was known to be relevant to attempt to solve any problem with which this specification is concerned.

SUMMARY

In this specification, a discussion of embodiments of the invention describing the device, should be understood to be embodiments applicable to all aspects of the device of the invention, unless specifically indicated. Even then, persons skilled in the art will readily appreciate which embodiments are adoptable for which aspects of the device of the invention. The same approach is applicable to embodiments of the invention describing method aspects, or any other aspects, of the invention.

According to a first aspect, the present invention provides a delivery device for deploying an insertable into an orifice guided by digit, the delivery device comprising:
a. insertable orientation means adapted to orient the insertable in a deployment orientation;
b. digit orientation means adapted to orient a portion of at least one digit in a navigation orientation,
the insertable orientation means and the digit orientation means adjoined across a partition with a partition cross-section, and the deployment orientation and the navigation orientation arranged for digit guided deployment of the insertable into the orifice.

In some preferred embodiments, the insertable orientation means further comprises a proximal portion adjacent the partition, the proximal portion adapted to temporarily accommodate at least a portion of the insertable. In some such embodiments, the insertable orientation means proximal portion is adapted to loosely accommodate the at least a portion of the insertable. In other of such embodiments, the insertable orientation means proximal portion is adapted to engage with the at least a proximal portion of the insertable. Some such embodiments are discussed in more detail below.

Particularly preferred embodiments provide that the insertable orientation means further comprises a sheath member with proximal and distal ends defining a sheath member length and having a sheath member thickness defined by inner and outer surfaces. In some such embodiments, the sheath member extends distally from, or adjacent, the insertable orientation means proximal portion such that the sheath member inner surface substantially surrounds the insertable in a surrounding configuration. In alternative embodiments, the inner surface of the sheath member surrounds a portion only of the insertable in the surrounding configuration.

In yet still further preferred embodiments, the insertable orientation means further comprises an orifice facing member with a thickness and a perimeter defining an orifice facing member surface area and having a radial perimeter width interposed between the perimeter and an inner side of the radial perimeter width. Preferably, the orifice facing member is adapted to substantially cover the sheath member distal end such that, in embodiments wherein the sheath member inner surface substantially surrounds the insertable, the insertable in the deployment orientation is in a housed configuration interposed between the insertable orientation means proximal portion and the orifice facing member.

In some embodiments, the housed configuration is adapted so that the insertable as housed is in a hygienic state. In other embodiments, the insertable as maintained in the housed configuration is in a sterile state.

When used in this specification, the word "hygienic" and grammatical variations of it, when used to describe a state of cleanliness for the insertable prior to unveiling from within the device, is used to reflect an acceptable state of cleanliness for therapeutic goods regulators, such as the Australian Therapeutic Goods Administration and the Australian Pesticides and Veterinary Medicines Authority or the United States Food and Drug Administration, to grant marketing authorisation for the sale of insertables adapted to be inserted in an orifice of an animal (including human animal) body without the need for prior sterilisation. The word "sterile" and grammatical variations of it, when used to describe a state of cleanliness for the insertable prior to unveiling from within the device, is used to refer to a state of sterility, meaning free of bacteria and other living microorganisms.

For embodiments of the delivery device in which the insertable is initially maintained in a sterile state in a housed configuration of the insertable orientation means, sterilisation can be achieved by a number of techniques that would be known to a skilled addressee, including, for example, via gamma radiation or using Ethylene Oxide gas (see, for example, haps://www.fda.gov/medical-devices/general-hospital-devices-and-supplies/ethylene-oxide-sterilization-medical-devices).

In some embodiments of the invention, particularly alternative embodiments, the orifice facing member is a separate item of the delivery device (i.e. not forming part of the insertable orientation means per se) which can be removably engaged from where it is adapted to engage with the inner surface of the sheath member.

The orifice facing member of some preferred embodiments is adapted to removably engage the sheath member distal end, the removable engagement comprising a frangible join of the orifice facing member perimeter and a perimeter of the inner surface of the sheath member adjacent a distal end of the sheath member. In some such embodiments, the removable engagement of the orifice facing member to the inner surface of the sheath member is adapted to permit forced disengagement along at least a portion of the frangible join.

In further preferred embodiments of the orifice facing member, at least one fragility means spans at least a portion of the orifice facing member thickness, the fragility means adapted to permit forced penetration of the orifice facing member. The fragility means of some embodiments spans the orifice facing member thickness. Preferably, the fragility means traverses the orifice facing member surface area from a centre of the orifice facing member surface area to a radial position on the inner side of the radial perimeter width.

Some particularly preferred embodiments of the orifice facing member comprise a plurality of fragility means each traversing the orifice facing member surface area from a centre of the orifice facing member surface area to a radial position on the inner side of the radial perimeter width. In some such embodiments, the radial positions on the inner side of the radial perimeter width are equally spaced apart. Both preferred and alternative embodiments disclose that the fragility means comprise a frangible line.

Many of such embodiments are preferably configured so as to inhibit an act of penetration of the fragility means from impairing integrity of the orifice facing member radial perimeter width.

To facilitate penetration of the orifice facing member by advancement of a distal end of the insertable, further preferred embodiments disclose that the orifice facing member surface area is shaped so as to substantially correspond to a shape of a cross-section of the insertable. In some such embodiments, when the insertable is in the deployment configuration, a distal end of the insertable is caused to extend beyond the sheath member distal end.

As previously mentioned, several embodiments of the orifice facing member of the invention are adapted so that the active penetration of the orifice facing member is inhibited from impairing integrity of the orifice facing member radial perimeter width. However, and further, in some such embodiments the orifice facing member radial perimeter width has a region structural resilience and the sheath member has a sheath structural resilience, and a soft resilience measure of the region structural resilience exceeds the soft resilience measure of the sheath structural resilience.

Preferably, the soft resilience measure of the region structural resistance comprises a sum of a soft resilience measure of the sheath member thickness and a soft resilience measure of the radial perimeter width. This 'formula' for calculating the soft resilience measure of the region structural resistance can be applied to embodiments in which the orifice facing member is an integral part of the insertable orientation means and also to embodiments in which the orifice facing member is a separate item of the deployment device.

In some preferred embodiments, the orifice facing member thickness is between 0.01 mm and 0.1 mm, more preferably between 0.03 mm and 0.07 mm, and more preferably still between 0.04 mm and 0.06 mm. In some particularly preferred embodiments, the orifice facing member thickness is 0.05 mm.

Preferred and alternative embodiments of the sheath member have a tapered configuration along the sheath member length from substantially widest at the sheath member distal end to substantially narrowest at the sheath member proximal end. The tapered configuration is, in some embodiments, adapted to enable movement of the sheath member distal end in the direction of the sheath member proximal end, the reduction in width of the sheath member distal end along the length of the sheath member permitting the sheath member to fold over onto itself, gradually exposing the sheath member inner surface and covering the sheath member outer surface.

The ability for the sheath member to fold over onto itself is further facilitated in some embodiments in which the sheath member thickness is adapted to accommodate a change in the sheath member from the surrounding configuration by the sheath member distal end being moved in a direction of the sheath member proximal end. In preferred embodiments, the sheath member thickness is between 0.2 mm and 1.0 mm, and in yet still further preferred embodiments, the sheath member thickness is between about 0.25 mm and 0.5 mm. A particularly preferred embodiment discloses the sheath member thickness as 0.3 mm.

Furthermore, in some preferred embodiments, movement of the sheath member distal end in the direction of the sheath member proximal end is accommodated along the sheath member length until the sheath member is in an insertable exposing configuration. Preferably, in the insertable exposing configuration, the sheath member distal end is extended beyond the sheath member proximal end, the partition, and at least a portion of the digit orientation means.

Several preferred and alternative embodiments disclose that a cross-section of the insertable orientation means is substantially circular or substantially elliptical. It is, however, particularly preferred for the insertable orientation means to have a circular cross-section. The circular cross-section of such embodiments is preferably maintained by the circular perimeters of the orifice facing member, the sheath member proximal end, the insertable orientation means proximal end, the partition, and at least a portion of the digit orientation means.

Embodiments of the delivery device in which the insertable orientation means has a circular cross-section are adapted so that as the insertable orientation means distal end is advanced in the direction of the insertable orientation means proximal end, the insertable orientation means distal end substantially concentrically passes over each of the other circular parameters assisting in the maintenance of the circular cross-section of the insertable orientation means. In alternative embodiments, however, the cross-section of the insertable orientation means can have different shapes, including multilateral, or, for example, star.

Preferred embodiments disclose that, as the sheath member is changed from the surrounding configuration to the insertable exposing configuration, the sheath member inner surface is increasingly exposed and the sheath member outer surface is increasingly covered.

As previously foreshadowed to, in some preferred embodiments, movement of the sheath member distal end in the direction of the sheath member proximal end causes a distal portion of the insertable to apply increasing pressure to the orifice facing member until the orifice facing member is forcibly disengaged from the sheath member distal end, and/or at least one fragility means is forcibly penetrated, allowing the insertable distal end to be exposed from within the surrounding configuration.

As the sheath member distal end is moved in the direction of the sheath member proximal end, preferred and alternative embodiments disclose that the insertable in the deployment orientation is increasingly exposed until substantially completely exposed when the sheath member is in the insertable exposing configuration. Typically, by the time the sheath member is in the insertable exposing configuration, the proximal end of the sheath member has extended over at least a portion of the digit.

In some such embodiments, the preferable consequent covering of the digit by the outer surface of the sheath member acts as if a glove-like member for the digit. Since at least a portion of the digit may be inserted through the orifice such that the insertable is inserted to a preferred depth within the orifice, having the glove-like member covering the digit can preferably improve overall hygiene during deployment of the insertable into the orifice.

As previously mentioned, in some embodiments, the insertable orientation means proximal portion is adapted to engage with the at least a proximal portion of the insertable. Preferably, the insertable orientation means proximal portion further comprises insertable engagement means adapted to engage at least the insertable proximal end.

In other embodiments, the insertable orientation means proximal portion is adapted to compressingly engage with the at least a portion of the insertable, such as the insertable proximal end. In some such embodiments, for example, a shape and/or size of the insertable orientation means proximal portion is relatively smaller than the at least a portion of the insertable such that the at least a portion of the insertable is temporarily accommodated in the insertable orientation means proximal portion because, during manufacture, or through manual manipulation of a user (on re-loading of the delivery device), the insertable proximal end is forcibly inserted into the orientation means proximal portion.

Alternatively, the insertable engagement means is sized and shaped so that the insertable proximal end is compressingly maintained in the insertable orientation means proximal portion. According to some such embodiments, the insertable engagement means comprises at least one rib member. Some such embodiments disclose that engagement can occur through a plurality of rib members that correspond to one or more groove members within the at least a proximal portion of the insertable. Some preferred and alternative embodiments provide that the rib members are equally spaced apart along a perimeter of the insertable orientation means proximal end. As would be appreciated by persons skilled in the art, some such embodiments are particularly preferred where the insertable is a tampon as many tampons are manufactured with groove members equally spaced apart around a perimeter of the tampons.

Preferred and alternative embodiments of the invention disclose that the digit orientation means further comprises a distal portion adjacent the partition, the digit orientation means distal portion adapted to fittingly maintain the portion of the at least one digit in the navigation orientation. In some such embodiments, the digit orientation means distal portion is adapted to fittingly maintain a proportion of a distal phalanx in a digit of a user. In other embodiments, the digit orientation means distal portion can accommodate a length of one or more than one phalanx of a digit.

It is particularly preferred for the digit orientation means distal portion to accommodate at least a portion of one digit. However, some alternative embodiments of the digit orientation means distal portion are further adapted to accommodate at least a portion of more than one digit, for example two digits or three digits. Whilst it is atypical, in some alternative embodiments, the digit orientation means distal portion is adapted to accommodate four digits or five digits.

Preferred and alternative embodiments of the delivery device provide that the insertable orientation means and the digit orientation means are adjoined across a partition. Preferably, the partition is formed of any one or more of the insertable orientation means proximal portion, the digit orientation means distal portion, or a partition member. In preferred embodiments, the partition provides a complete separation between the insertable orientation means and the digit orientation means.

In embodiments wherein the insertable is a tampon, an orifice may be formed in the partition so as to permit passage of a withdrawal cord member which typically extends from a proximal portion of commercially available tampons, and is used to enable removal of the tampon from within the vaginal cavity. Embodiments of the delivery device which permit passage of a withdrawal cord member through the partition are adapted such that the orifice for receiving the withdrawal cord member has a diameter, or widest portion, only minimally greater than a cross-section of the withdrawal cord member. Such embodiments are configured so that an extent of fluid communication across a thickness of the partition is preferably minimised. In some embodiments, the orifice for receiving the withdrawal cord member is sized so as to compressingly maintain the withdrawal cord member from moving without intervention from a user.

In other embodiments wherein the insertable is a tampon, an adhesive means is applied to the insertable orientation means proximal end such that at least a proximal end of the withdrawal cord member adheres to the insertable orientation means proximal end. Such embodiments enable partition integrity to be maintained. In manufacturing terms, the adhesive means may take the form of a glue dot.

In some such preferred embodiments, a distal end of the withdrawal cord member is connected to a proximal end of the tampon, or is interwoven with other materials forming the tampon, such that at least the distal end of the withdrawal cord member remains with the proximal end of the tampon even when the tampon has been deployed into the vaginal cavity. In situ, a proximal end of the withdrawal cord member dangles outside the vagina. A user can grip the distal end of the withdrawal cord member and pull on it to remove the tampon from the vagina when desired.

In particularly preferred embodiments, the navigation orientation is an orientation in which the portion of the at least one digit is oriented for application of at least one directional force to the insertable in the deployment orientation. In some of those and other particularly preferred embodiments the deployment orientation is an orientation in which the insertable is oriented for deployment through physical structures defining the orifice.

Preferably, the deployment orientation has a longitudinal axis and the navigation orientation has a longitudinal axis and the arrangement of the deployment orientation and the navigation orientation is such that the deployment orientation longitudinal axis and the navigation orientation longitudinal axis are substantially parallel, substantially aligned, or intersect at an angle adapted to facilitate deployment of the insertable into the orifice accounting for at least one spatially available approach by a hand from which the at least one digit extends to physical structures defining the orifice.

According to some preferred and alternative embodiments, the spatially available approach is an approach that takes account of anthropometric measurements enabling a user to insert the insertable with ergonomic efficiency, meaning from a position that is ergonomically sound and in a timeframe being approximately equivalent to a typical timeframe for insertion of the insertable into an orifice absent the device. In some such embodiments, the expression 'ergonomically sound' is one that refers to an approach that does not cause a user to overextend her ordinary range of rotation of the shoulder joint and/or enables the tampon to be deployed into the orifice causing minimal discomfort. A further advantage of this invention being particularly suited to ergonomically sound approaches enabling the tampon to be deployed into the orifice causing minimal discomfort is highlighted in circumstances where a female experiences heightened sensitivity in and around the vagina, particularly associated with penetration, for example, vaginismus.

In some embodiments, the approach encompassed by 'ergonomically sound' is the approach that a user self-applying the device to insert the tampon is likely to adopt. For example, a user may adopt an under-hand action to use the device to insert the tampon. In another example, the user may be in a standing position or crouching. In all such examples, the user will have her thighs spaced apart, and may use her other hand to separate the labia for ease of insertion of the device loaded with the tampon. The approach may include an inward and upward movement of the hand in a curved motion, such that a longitudinal axis of the deployment orientation is angled directed to the lumbar area of the user's spine.

In some embodiments, the insertable is in the deployment orientation when a longitudinal axis of the insertable is substantially parallel to a longitudinal axis of the digit orientation means distal end. In other embodiments, the insertable is in the deployment orientation when the longitudinal axis of the insertable is at an angle to the longitudinal axis of the digit orientation means distal end. In preferred and alternative variations to this embodiment, a physical relationship between the insertable orientation means and the digit orientation means is configured so that a side view of the delivery device reflects an extension of a natural flexed curvature of a user's digit, particularly the natural flexed curvature of the index finger.

In other particularly preferred embodiments, the portion of the least one digit is in the navigation orientation when a longitudinal axis of the at least one digit is substantially parallel to a longitudinal axis of the insertable orientation means proximal end. In some of those embodiments and in others, the at least one directional force is substantially aligned with a central axis of the orifice.

It is particularly preferred for the navigation orientation to orient the at least one digit for application of a plurality of directional forces to the insertable in the deployment orientation, the plurality directional forces adapted so as to guide the insertable through physical structures defining the orifice and/or to guide the insertable into the orifice. Preferably, advancement of the insertable through physical structures defining the orifice transmits proprioceptive cues through the partition to the portion of the at least one digit enabling informed selection of the directional force or forces necessary to navigate the insertable through physical structures defining the orifice and/or into the orifice. The transmission of the proprioceptive cues through the partition preferably occurs in some embodiments because the navigation orientation is such that the at least a portion of the digit presses up against the partition.

The delivery device of some preferred embodiments is formed as a single piece, and of some other preferred embodiments is formed as two pieces, wherein a first piece comprises the insertable orientation means and the second piece comprises the digit orientation means. Yet still further embodiments, including alternative embodiments, disclose three or more items that are assembled in the manufacture of the delivery device. Some such embodiments are discussed in more detail below.

According to a second aspect, the invention provides an insertable device for hygienic digital insertion into an orifice, the device comprising:

a. a flexible sleeve comprising a first end and a second end, wherein a rigid portion is attached to a first end of the flexible sleeve and a thin membrane covering is formed between the first end and a second end of the flexible sleeve;
b. a rigid elongate digit cover attached to the second end of the flexible sleeve, the digit cover comprising a first end and a second end to receive a digit inserted by a user of the insertable device,
c. a deployable item releasably secured to the first end of the rigid elongate digit cover.

In some preferred embodiments of the second aspect of the invention, the insertable device comprises two or more inflection points such that the flexible sleeve is movable between a first configuration adapted to cover the deployable item and a retracted second configuration adapted to uncover the deployable item.

In some embodiments of the second aspect of the invention, the first end of the flexible sleeve comprises a first inflection point. Preferably, the first end of the rigid elongate digit cover comprises a second inflection point. In alternative embodiments, the first end of the rigid elongate digit cover comprises at least two or more inflection points.

In some preferred embodiments of the second aspect of the invention, the flexible sleeve is movable from the first configuration as the rigid portion is moved towards the second end of flexible sleeve such that thin membrane is collapsible upon itself. Preferably, the flexible sleeve then inverts at the second inflection point such that the thin membrane is inverted and provides a sheath over the surface of the rigid elongate digital cover as the rigid portion is moved along the surface of rigid elongate digital cover. In alternative embodiments of the second aspect of the invention, the flexible sleeve inverts at the at least two or more inflection points such that the thin membrane is inverted and provides a sheath over the surface of the rigid elongate digital cover as the rigid portion is moved along the surface of rigid elongate digital cover.

In a preferred embodiment of the second aspect of the invention, the insertable device further comprises an internal rigid support internal to the thin membrane and attached to the first end of the rigid elongate digit cover wherein the internal rigid support functions hold the deployable item to be digitally inserted into the orifice.

In such preferred embodiments of the second aspect of the invention, the deployable item to be digitally inserted is covered by the thin membrane of the flexible sleeve. In further such preferred embodiments, the deployable item to be digitally inserted is hermetically sealed within the flexible sleeve and breaks through the hermetic seal upon application of force from an inserted digit covered by the rigid elongate digit cover.

In yet still further such preferred embodiments of the second aspect of the invention, the breaking of the hermetic seal allows the thin membrane to form an area of ergonomic contact around the point of insertion, wherein the area of ergonomic contact is formed by collapsible folds of the thin membrane as the deployable item is digitally inserted into the orifice.

In a preferred embodiment of the second aspect of the invention, the internal surface at the first end of the rigid elongate digital cover comprises a tapered configuration to accommodate for a variety of digit sizes. In alternative embodiments of the second aspect of the invention, the internal surface at the first end of the rigid elongate digital cover comprises a tapered configuration to accommodate at least two or more digits.

In a further preferred embodiment of the second aspect of the invention, after the deployable item is inserted into the orifice, the rigid elongate digital cover is sheathed in the inverted thin membrane and rigid portion as the insertable device is removed from the orifice.

In yet still further preferred embodiment of the second aspect of the invention, a removal cord attached to the item can pass through an opening in the internal rigid support such that, as the insertable device is removed from the orifice, the deployable item remains secured inside the orifice with the removal cord accessible from the entrance to the orifice.

In some embodiments in which the delivery device is comprised of at least two pieces, a proximal end of the first piece is adapted to fittingly engage a distal end of the second piece. In other of such embodiments, the distal end of the second piece is adapted to fittingly engage a proximal end of the first piece. This fitting engagement can be provided by a range of means or mechanisms that would be well known to persons skilled in the art. In particularly preferred embodiments, the fitting engagement of the proximal end of the first piece with a distal end of the second piece, or of a distal end of the second piece with a proximal end of the first piece, is provided by a plurality of rib members or teeth members. In some such embodiments, the rib members or teeth members are equally spaced apart along a perimeter of an inner side of the distal end of the second piece or of the proximal end of the first piece, as the case may be.

Corresponding groove members may be equally spaced apart along the perimeter of an outer side of the proximal end of the first piece or of the outer side of side of the distal end of the second piece, for releasable engagement of the insertable orientation means with the digit orientation means.

Alternatively, the proximal end of the first piece or the distal end of the second piece may be forcibly engaged with the distal end of the second piece or the proximal end of the first piece, as the case may be. In some such alternative embodiments, engagement of the insertable orientation means and digit orientation means is achieved by compressing engagement of the proximal end of the first piece with the distal end of the second piece or of the distal end of the first piece with the proximal end of the second piece, again as the case may be.

Materials for the manufacture of preferred embodiments of the delivery device are selected such that they exhibit one or more of the following properties: medical grade, mouldable, invertible including invertible without split, non-porous, flexible, resilient, durable, stable at room and transport temperatures, water-soluble, rapidly biodegradable, nonallergenic, approved by therapeutic regulators for medical or ingested drug delivery, and having a shelf-life that exceeds 2 years, more preferably 3 years, and more preferably still, 5 years, when stored according to storage instructions. In some preferred embodiments, another characteristic for the materials is that they do not decompose or melt when the delivery device is in direct sunlight or in a location where the temperature exceeds normal room temperature.

In particularly preferred embodiments, one or more materials of which the delivery device is formed comprise thermoplastic elastomers or a mouldable bioplastic elastomers including biodegradable bioplastic thermoplastic elastomers.

Some other materials that may be used to manufacture the delivery device included gelatin or potato starch, gel caps, plasticisers, such as glycerin and sorbitol. Colouring or flavouring agents may also be incorporated into the manufacture of the delivery device.

Some specific materials from which the delivery device can be formed include, but are not limited to those selected from the group consisting of: Kuraray Co Ltd's MOWIFLEX™, Mitsubishi Chemical Corporation's BioPBS™, Bio-tec Biologische Naturverpackungen GmbH & Co. KG's BIOPLAST™TPS, Zhejiang Hisun Biomaterials Co Ltd's REVODE213™, Mitsubishi Chemical Corporation's ZELAS™, one or more products from Mitsubishi Chemical Corporation's TEFABLOC™ TOFI210 series, and a styrene block copolymer, including but not limited to, one or more of Kraton Polymers Research B.V.'s THERMOLAST™ M compounds.

In some embodiments, the sheath member is formed of a thermoplastic elastomer material within the class certified by the International Organisation for Standardisation as ISO18064. In the same, or another, embodiments the orifice facing member is formed of a layer of polyalkene or polyamide.

In some preferred embodiments of at least the second aspect of the invention, the device is made from a water-dissolvable material. In a particularly preferred embodiment of at least the second aspect of the invention, the device is made from a polyvinyl alcohol polymer (PVA/PVOH). In some alternative embodiments of at least the second aspect of the invention, the device is made from one or more materials which comprise bioplastic elastomers including biodegradable thermoplastic elastomers.

As would be appreciated by persons skilled in the art, the orifice into which the insertable is deployed is an orifice internal to an animal. Some embodiments of the delivery device are adapted so that the orifice internal to the animal is accessible through an external orifice of the animal. In both preferred and alternative embodiments, the orifice is an opening into a vagina, an opening into an anus, an opening into a urinary tract, an opening into a penis, a nostril, an opening into an ear, mouth. In some alternative embodiments, the orifice is an opening into a wound or incision.

The delivery device of preferred and alternative embodiments is adapted to deploy various kinds of insertables. In some such embodiments, the insertable is a tampon, pessary, suppository, clinical screening device, swab, cream, lubricant, pellet, tablet, capsule, supplement, implantable, medical or surgical device, therapeutic, or other insertable adapted to be of therapeutic or diagnostic benefit. In yet still further embodiments, the insertable may be an active or passive implantable or a device such as a sensor for monitoring, alerting, recording or communicating data recorded from within the orifice, such as biological data, or an implantable therapeutic device for ongoing treatment or medical intervention as required.

In a particularly preferred embodiment, the insertable is a tampon.

According to a third aspect, the present invention provides a delivery device for deploying a tampon into a vaginal orifice guided by digit, the delivery device comprising:
  a. insertable orientation means adapted to orient the tampon in a deployment orientation;
  b. digit orientation means adapted to orient a portion of at least one digit in a navigation orientation,
  the insertable orientation means and the digit orientation means adjoined across a partition with a partition cross-section, and the deployment orientation and the navigation orientation arranged for digit guided deployment of the tampon into the orifice.

In some particularly preferred embodiments, the tampon is positioned in the insertable orientation means during manufacture. A proximal end of the tampon is engaged with the proximal end of the insertable orientation means. A withdrawal cord member typically extends from a distal end of the tampon.

The withdrawal cord member is typically interwoven with the material from which a body of the tampon is formed, or otherwise substantially unreleasably connected to a body of the tampon, preferably adjacent the tampon proximal end. In particularly preferred embodiments the withdrawal cord member is inter-engaged with the body of the tampon and is adapted for withdrawal of the deployed tampon from the vaginal cavity when desired. Preferably, the withdrawal cord member extends from a distal end, engaged with the tampon body, to a proximal end, the withdrawal cord member proximal end being adapted to be held by a user.

In some embodiments, an orifice penetrates the partition leading to fluid communication between the insertable orientation means and the digit orientation means. The penetrating orifice is adapted to accommodate a cross-section of a withdrawal cord member. In some embodiments, the penetrating orifice is adapted to compressingly accommodate the cross-section of the withdrawal cord member.

In some such embodiments, the withdrawal cord member passes through the penetrating orifice and extending from engagement of the withdrawal cord member distal end with the proximal end of the tampon to the withdrawal cord member proximal end. In some preferred and alternative embodiments, the withdrawal cord member proximal end is in a freely movable orientation within the digit orientation means. When a user inserts a distal portion of one or more of her digits into the digit orientation means, the withdrawal cord proximal end is preferably compressed between a side of the digit and an inner wall of the digit orientation means.

In some such embodiments, following deployment of the tampon into the vaginal cavity, the device is withdrawn and the withdrawal cord member proximal end slides through the penetration orifice until the withdrawal cord member proximal end is in a freely movable orientation external to the vaginal orifice.

In other embodiments, there is no penetrating orifice in the partition. In some such embodiments, wherein the tampon includes a withdrawal cord member, a proximal end of the withdrawal cord member is affixed to a distal surface of the partition. Preferably, the withdrawal cord member proximal end is releasably affixed to the distal surface of the partition by a releasable affixture, such as a glue dot, or other adhesive means.

A balance of withdrawal cord member is then configured in a concentric circular wind configuration such that a length of the withdrawal cord member is accommodated by the proximal end of the insertable orientation means interposed between a proximal end of the body of the tampon and the partition. In alternative embodiments wherein the withdrawal cord member proximal end is affixed to a distal surface of the partition, a balance of withdrawal cord member is collapsed into a spaghetti configuration accommodated by the proximal end of the insertable orientation means interposed between a proximal end of the body of the tampon and the partition.

According to some such embodiments, following deployment of the tampon into the vaginal cavity, as the device is withdrawn, the withdrawal cord member is extended from the concentric circular wind configuration, or from the spaghetti configuration, until there is a tension along the withdrawal cord member between the withdrawal cord member distal end (still connected to a proximal end of the tampon deployed in the vaginal cavity) and the withdrawal cord member proximal end (still affixed to the distal surface of the partition). Forcible withdrawal of the device against the withdrawal cord member tension undermines an integrity of the releasable affixture. Upon release of the affixture, the withdrawal cord member proximal end is in a freely movable orientation external to the vaginal orifice.

According to a fourth aspect, the invention provides an insertable device for hygienic digital insertion of a tampon, the device comprising:
 a. a flexible sleeve comprising a first end and a second end, wherein a rigid portion is attached to a first end of the flexible sleeve and a thin membrane covering is formed between the first end and a second end of the flexible sleeve; and
 b. a rigid elongate digit cover attached to the second end of the flexible sleeve, the digit cover comprising a first end and a second end, and
 c. a tampon releasably secured to the first end of the rigid elongate digit cover;
 wherein the insertable device comprises two inflection points such that the flexible sleeve is movable between a first configuration adapted to cover the tampon and a retracted second configuration adapted to uncover the tampon.

In a preferred embodiment of the fourth aspect of the invention, the insertable device comprises an internal rigid support internal to the thin membrane and attached to the first end of the rigid elongate digit cover wherein the internal rigid support holds the tampon to be digitally inserted, wherein the tampon is covered by the thin membrane of the flexible sleeve, and wherein the internal surface at the first end of the rigid elongate digital cover comprises a tapered configuration to accommodate for a variety of digit sizes. In alternative embodiments of the fourth aspect of the invention, the internal surface at the first end of the rigid elongate digital cover comprises a tapered configuration to accommodate at least 2 or more digits.

In some preferred embodiments of the fourth aspect of the invention, the tampon is hermetically sealed within the flexible sleeve and the tampon breaks through the hermetic seal upon application of force from an inserted digit covered by the rigid elongate digit cover. In further preferred embodiments of the fourth aspect of the invention, the hermetic seal comprises at least one frangible perforation. In alternative embodiments of the fourth aspect of the invention, the hermetic seal comprises no frangible perforation. In some such alternative embodiments, the hermetic seal is able to be removed, including by peeling away the hermetic seal.

In a preferred embodiment of the fourth aspect of the invention, the flexible sleeve is movable from the first configuration as the rigid portion is moved towards the second end of flexible sleeve such that thin membrane is collapsible upon itself and wherein the flexible sleeve inverts at the second inflection point such that the thin membrane is inverted and provides a sheath over the surface of the rigid elongate digital cover as the rigid portion is moved along the surface of rigid elongate digital cover.

Preferred embodiments of the delivery device are manufactured using a manufacturing technique selected from one or more of 3D printing, blown-film extrusion process, rotational (roto) moulding, injection blow moulding, reaction injection moulding, vacuum casting, thermoforming, compression moulding, high-frequency welding or dielectric welding. However, other manufacturing techniques that could readily be identified by persons skilled in the art can also be adopted in the manufacture of the delivery device of the invention.

According to a fifth aspect, the present invention provides a method for deploying an insertable into an orifice guided by digit, the method comprising:
 a. providing a delivery device according to any device aspect of the invention wherein the insertable is temporarily accommodated in a deployment orientation;
 b. inserting a portion of at least one digit into the digit orientation means in a navigation orientation;
 c. optionally exposing the insertable;

d. using the digit, guiding deployment of the insertable into the orifice from a distal end of the insertable to a proximal end of the insertable; and e. withdrawing the delivery device, leaving the insertable deployed in the orifice.

Preferred and alternative embodiments of the method disclose that the step of inserting a portion of at least one digit into the digit orientation means includes adjusting the positioning of the portion of the at least one digit until the portion of the at least one digit is in the navigation orientation. Various configurations of the positioning of the portion of the least one digit have been described variously throughout the specification having regard to different embodiments of the delivery device.

For example, in some embodiments, the insertable is a tampon having a withdrawal cord member which extends from a proximal portion of a body of the tampon and a penetration orifice adapted to accommodate a cross-section of the withdrawal cord member is formed in the partition across which the insertable orientation means and the digit orientation means are adjoined. According to some of those embodiments, a proximal end of the withdrawal cord member is in a freely movable configuration within the digit orientation means. For embodiments of this kind, when a portion of the least one digit is inserted into the digit orientation means, the withdrawal cord member proximal end is compressingly maintained between a side of the portion of the at least one digit and an inner wall of the digit orientation means.

In some preferred embodiments, the step of exposing the insertable occurs when the insertable orientation means further comprises a sheath member and the insertable is temporarily accommodated in the deployment orientation within a surrounding configuration of an inner surface of a sheath member. In yet still further preferred embodiments, the step of exposing the insertable occurs when the insertable orientation means further comprises an orifice facing member adapted to substantially cover a distal end of the sheath member such that the insertable in the deployment orientation is in a housed configuration interposed between a proximal portion of the insertable orientation means and the orifice facing member.

In some preferred embodiments of the method, the step of exposing the insertable occurs when a distal end of the insertable orientation means is moved in a direction of a proximal end of the insertable orientation means. For those embodiments in which the insertable orientation means further comprises a sheath member or those in which the insertable orientation means further comprises an orifice facing member, the insertable will be gradually exposed during movement of the insertable orientation distal end in the direction of the insertable orientation proximal end, until the sheath member is in the insertable exposing configuration.

Preferred and alternative embodiments of the method further disclose that when the sheath member is in the insertable exposing configuration, an outer surface of the sheath member covers at least the insertable orientation means proximal end, the partition, and a distal end of the digit orientation means. According to some such embodiments, the sheath member outer surface further covers at least a portion of the digit, thereby acting as a glove-like member.

According to some preferred embodiments of the method, the step of using the digit, guiding deployment of the insertable into the orifice includes application of at least one directional force such that the insertable is guided through physical structures defining the orifice. In further preferred embodiments of this step, a user selects the directional force or forces necessary to navigate the insertable through the physical structures defining the orifice and/or into the orifice, responsive to proprioceptive cues transmitted the portion of the at least one digit through the partition.

BRIEF DESCRIPTION OF THE FIGURES

The invention is explained in detail below with reference to the drawings, in which:

FIG. 16 is a side view of one embodiment of the delivery device according to the invention; and FIG. 17 is a sagittal view of the embodiment of the delivery device depicted in FIG. 16.

DETAILED DESCRIPTION

Figure 3:
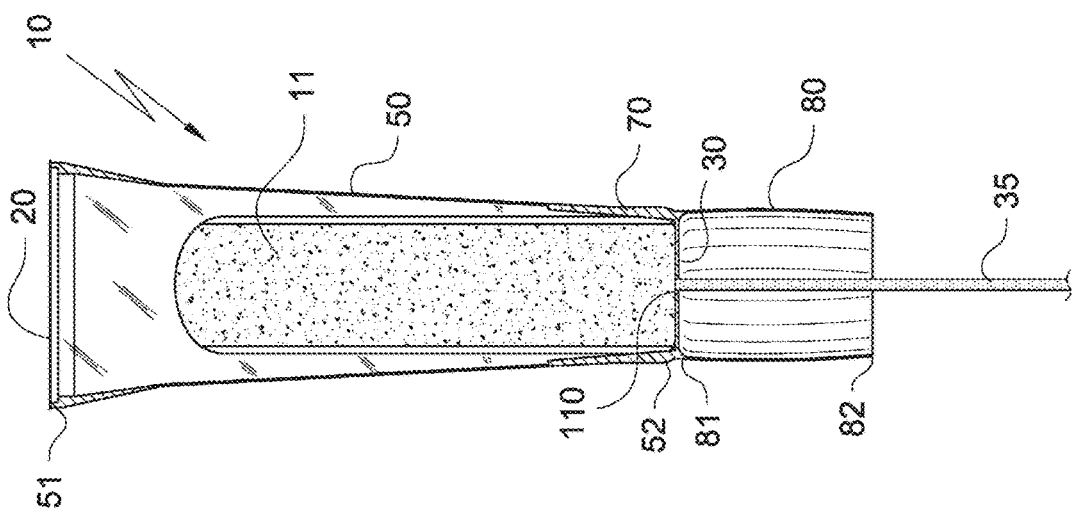
FIG. 3 is a sagittal section of the delivery device in FIG. 2.

Preferred embodiments of the invention will now be described with reference to the accompanying drawings. While the figures tend to illustrate embodiments in which the insertable or deployable item is a tampon, as has been explained elsewhere in this specification, and as would be readily apparent to a skilled addressee, there are many other forms that the insertable or deployable item can take. All such forms are within the scope of the invention.

The preferred delivery device 10 of the present invention is adapted to deploy an insertable 11 into an orifice guided by digit 40, the delivery device 10 comprises:
  a. insertable orientation means 50 adapted to orient the insertable 11 in a deployment orientation (as depicted variously throughout the figures);
  b. digit orientation means 80 adapted to orient a portion of at least one digit 40 in a navigation orientation (as depicted variously throughout the figures),
    the insertable orientation means 50 and the digit orientation means 80 adjoined across a partition 30 with a partition cross-section, and the deployment orientation and the navigation orientation arranged for digit guided deployment of the insertable 11 into the orifice.

The insertable orientation means 50 further comprises a proximal portion 52 adjacent the partition 30, the proximal portion 52 is adapted to temporarily accommodate at least a portion of the insertable 11. In some such embodiments, the insertable orientation means proximal portion 52 is adapted to loosely accommodate the at least a portion of the insertable 11. In other of such embodiments, the insertable orientation means proximal portion 52 is adapted to engage with the at least a proximal portion 36 of the insertable.

Particularly preferred embodiments provide that the insertable orientation means 50 further comprises a sheath member 16 with proximal 14 and distal 13 ends defining a sheath member length and having a sheath member thickness defined by inner and outer surfaces. In some such embodiments, the sheath member 16 extends distally from, or adjacent, the insertable orientation means proximal portion 52 such that the sheath member 16 inner surface substantially surrounds the insertable 11 in a surrounding configuration.

The insertable orientation means 50 further comprises an orifice facing member 20 with a thickness and a perimeter 90 defining an orifice facing member surface area and having a radial perimeter width 93 interposed between the perimeter 90 and an inner side 91 of the radial perimeter width 93. The orifice facing member 20 is adapted to substantially cover the sheath member distal end 13 such that, in embodiments wherein the sheath member 16 inner surface substantially surrounds the insertable 11, the insertable 11 in the deployment orientation is in a housed configuration 23 interposed between the insertable orientation means proximal portion 52 and the orifice facing member 20.

Figure 11:
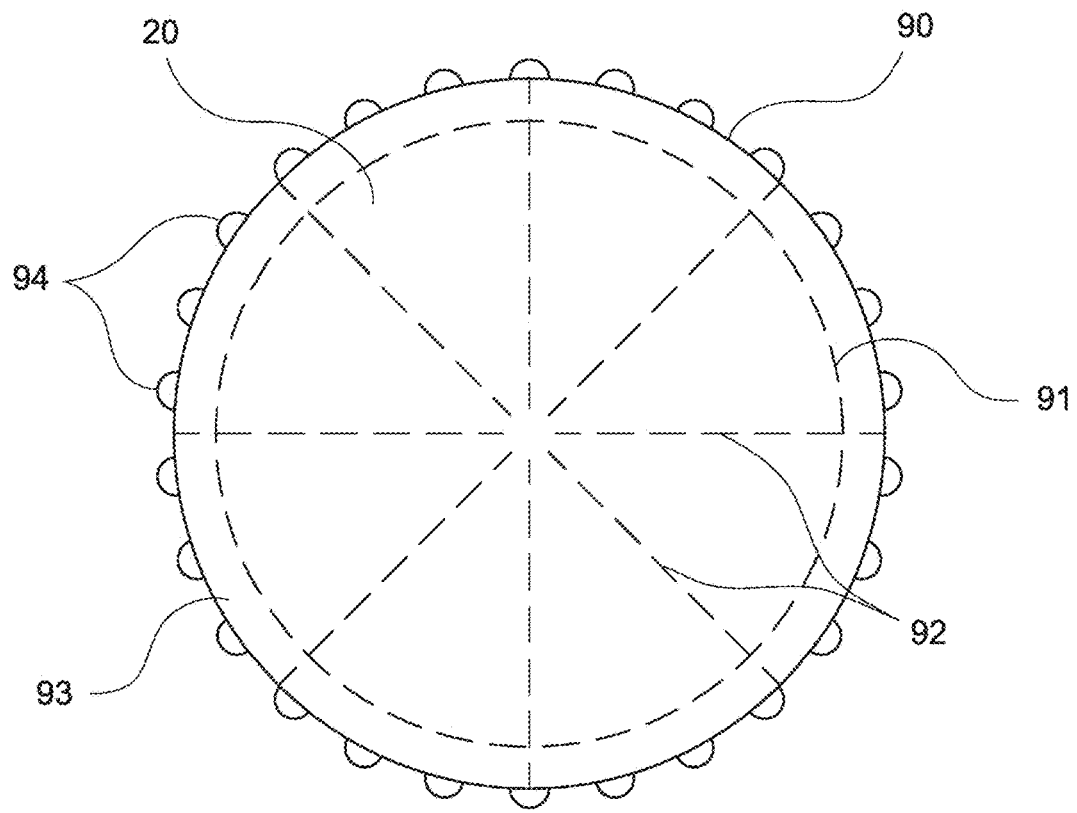
FIG. 11 is a top view of one embodiment of the orifice facing member different to the embodiment depicted in FIG. 10.

As illustrated in FIG. 11, the orifice facing member 20 of some preferred embodiments is adapted to removably engage the sheath member distal end 51, the removable engagement comprising a frangible join 94 of the orifice facing member perimeter 90 and a perimeter of the inner surface of the sheath member adjacent a distal end 51 of the sheath member. The removable engagement of the orifice facing member 20 to the inner surface of the sheath member is adapted to permit forced disengagement along at least a portion of the frangible join 94.

In further embodiments of the orifice facing member 20, at least one fragility means 92 spans at least a portion of the orifice facing member thickness, the fragility means 92 adapted to permit forced penetration of the orifice facing member 20. Preferably, the orifice facing member 20 comprises a plurality of fragility means 92 each traversing the orifice facing member 20 surface area from a center of the orifice facing member surface area to a radial position on the inner side 91 of the radial perimeter width 93.

The orifice facing member radial perimeter width 93 has a region structural resilience and the sheath member 16 has a sheath structural resilience, and a soft resilience measure of the region structural resilience exceeds the soft resilience measure of the sheath structural resilience.

The sheath member 16 has a tapered configuration along the sheath member 16 length from substantially widest at the sheath member distal end 13 to substantially narrowest at the sheath member proximal end 14. The tapered configuration enables movement of the sheath member distal end 13 in the direction of the sheath member proximal end 14, the reduction in width of the sheath member distal end 13 along the length of the sheath member permitting the sheath member to fold over onto itself, gradually exposing the sheath member inner surface and covering the sheath member outer surface.

Movement of the sheath member distal end 13 in the direction of the sheath member proximal end 14 is accommodated along the sheath member length until the sheath member 16 is in an insertable exposing second configuration 24. Preferably, in the insertable exposing second configuration 24, the sheath member distal end 13 is extended beyond the sheath member proximal end 14, the partition 30, and at least a portion of the digit orientation means 17, 80.

Preferred embodiments disclose that, as the sheath member 16 is changed from the surrounding first configuration 23 to the insertable exposing second configuration 24, the sheath member inner surface is increasingly exposed and the sheath member outer surface is increasingly covered.

Figure 12:
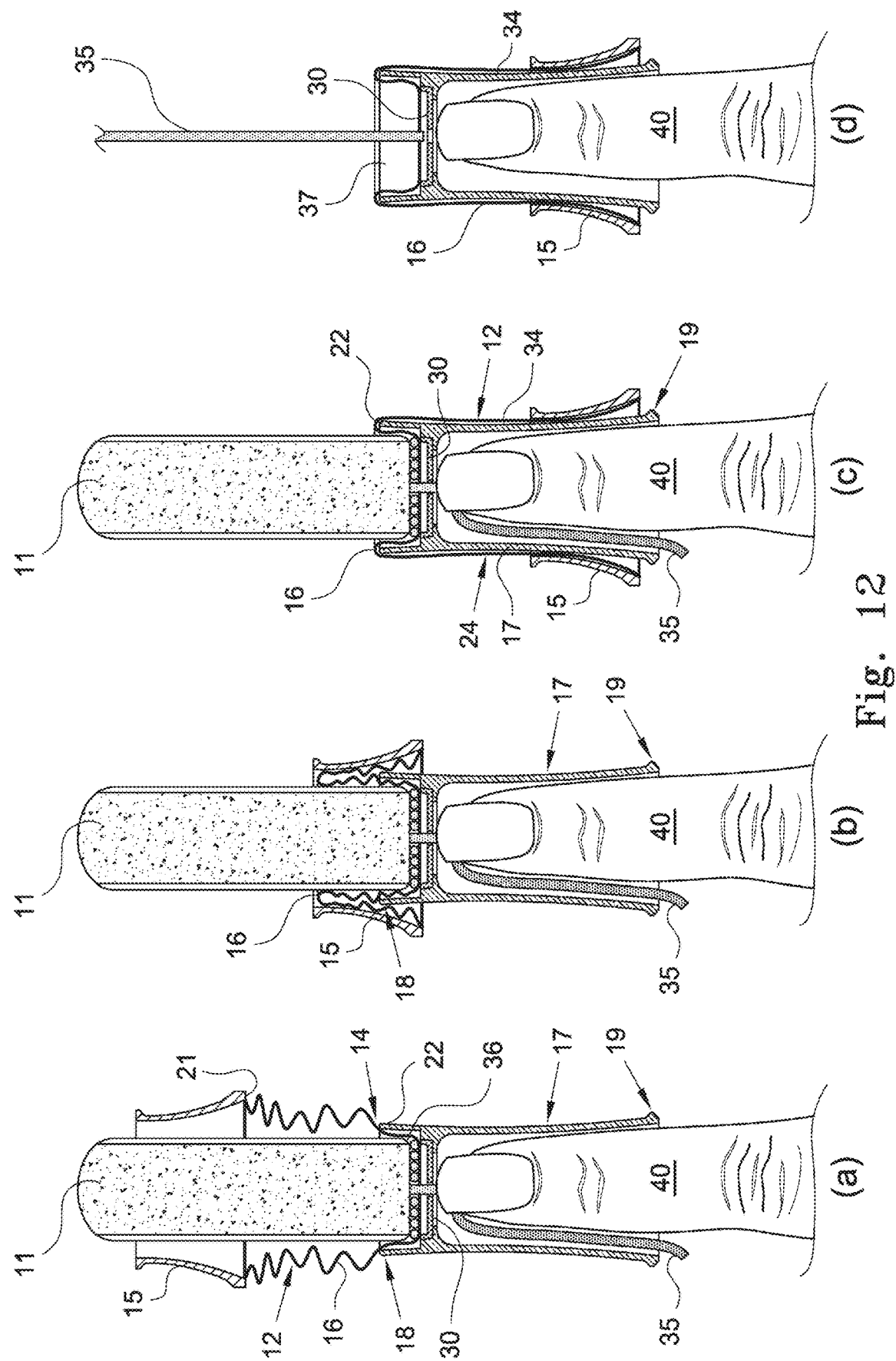
FIG. 12 provides four sagittal sections of the embodiment of the device depicted in FIG. 5 with each successive view ((a) through (d)) illustrating how the sagittal section changes as the sheath member is changed from a surrounding configuration to an insertable exposing configuration.

Viewed as schematics, FIG. 12 illustrations (a) through (d) show that as the sheath member distal end 13 is moved in the direction of the sheath member proximal end 14, the insertable 11 in the deployment orientation is increasingly exposed until substantially completely exposed when the sheath member 16 is in the insertable exposing second configuration 24. Typically, by the time the sheath member 16 is in the insertable exposing second configuration 24, the proximal end of the sheath member 14 has extended over at least a portion of the digit 40. The insertable exposing second configuration 24 is also illustrated with respect to a different embodiment of the invention in FIG. 4.

Figure 2:
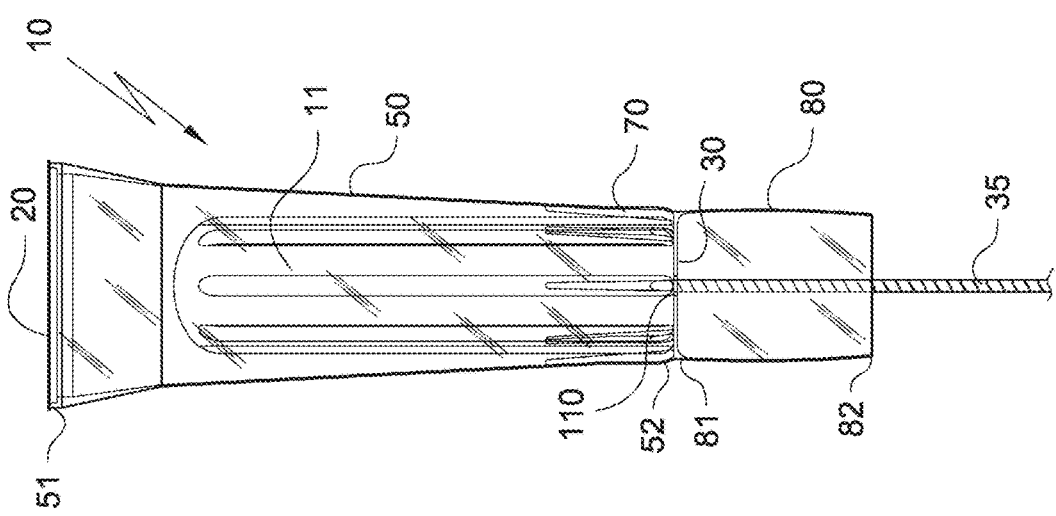
FIG. 2 is a side view of the delivery device according to the embodiment of the delivery device depicted in FIG. 1, wherein the insertable is a tampon with a withdrawal cord member.
Figure 1:
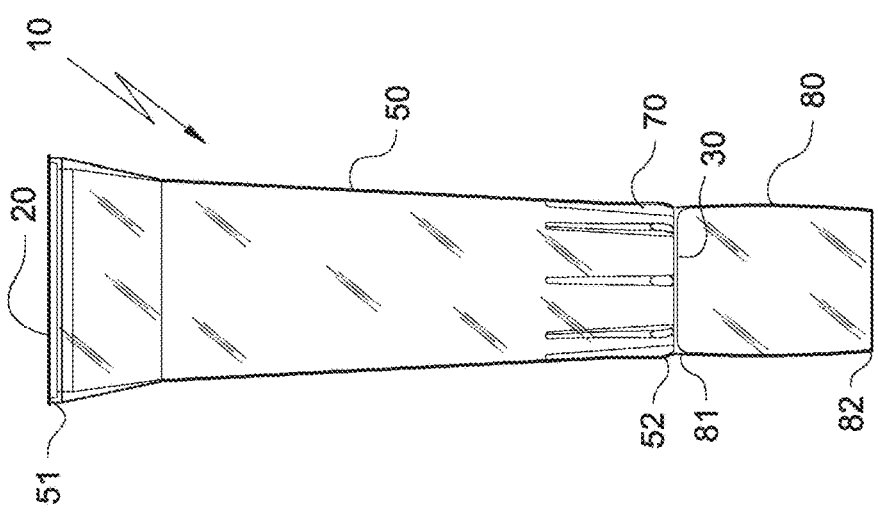
FIG. 1 is a side view of the delivery device according to one embodiment of the invention.

As previously mentioned, in some embodiments, for example, those illustrated by FIGS. 2 and 3, the insertable orientation means proximal portion 52 is adapted to engage with the at least a proximal portion 36 of the insertable 11. Preferably, the insertable orientation means 50 proximal portion 52 further comprises insertable engagement means 70 adapted to engage at least the insertable 11 proximal end 36. Where the insertable 11 is a tampon as many tampons are manufactured with groove members equally spaced apart around a perimeter of the tampons.

The digit orientation means 80 further comprises a distal portion 81 adjacent the partition 30, the digit orientation means distal portion 81 adapted to fittingly maintain the portion of the at least one digit 40 in the navigation orientation. In some such embodiments, the digit orientation means distal portion 81 is adapted to fittingly maintain a proportion of a distal phalanx in a digit 40 of a user.

The partition 30 is formed of any one or more of: the insertable orientation means proximal portion 52, 14, the digit orientation means distal portion 51, 13, or a partition member (not shown). In preferred embodiments, the partition 30 provides a complete separation between the insertable orientation means 50, 16 and the digit orientation means 80, 17.

Where the insertable 11 is a tampon, an orifice 110 may be formed in the partition 30 so as to permit passage of a withdrawal cord member 35 which typically extends from a proximal portion of commercially available tampons and is used to enable removal of the tampon from within the vaginal cavity. Embodiments of the delivery device 10 which permit passage of a withdrawal cord member 35 through the partition 30 are adapted such that the orifice 110 for receiving the withdrawal cord member 35 has a diameter, or widest portion, only minimally greater than a cross-section of the withdrawal cord member 35.

In other embodiments wherein the insertable 11 is a tampon, an adhesive means 100 is applied to the insertable orientation means proximal end 52 such that at least a proximal end of the withdrawal cord member 35 adheres to the insertable orientation means proximal end 52. Such embodiments enable partition 30 integrity to be maintained.

The deployment orientation has a longitudinal axis and the navigation orientation has a longitudinal axis and the arrangement of the deployment orientation and the navigation orientation is such that the deployment orientation longitudinal axis and the navigation orientation longitudinal axis are substantially parallel, substantially aligned, or intersect at an angle adapted to facilitate deployment of the insertable into the orifice accounting for at least one spatially available approach by a hand from which the at least one digit extends to physical structures defining the orifice.

The spatially available approach is an approach that takes account of anthropometric measurements enabling a user to insert the insertable 11 with ergonomic efficiency, meaning from a position that is ergonomically sound and in a timeframe being approximately equivalent to a typical timeframe for insertion of the insertable 11 into an orifice absent the device 10.

As illustrated in FIGS. 16 and 17, the insertable 11 is in the deployment orientation when the longitudinal axis of the insertable 11 is at an angle to the longitudinal axis of the digit orientation means distal end 18. Where the physical relationship between the insertable orientation means 16 and the digit orientation means 17 is configured so that a side view of the delivery device reflects an extension of a natural flexed curvature of a user's digit, particularly the natural flexed curvature of the index finger. This embodiment is well illustrated, particularly by FIG. 17.

Figure 13:
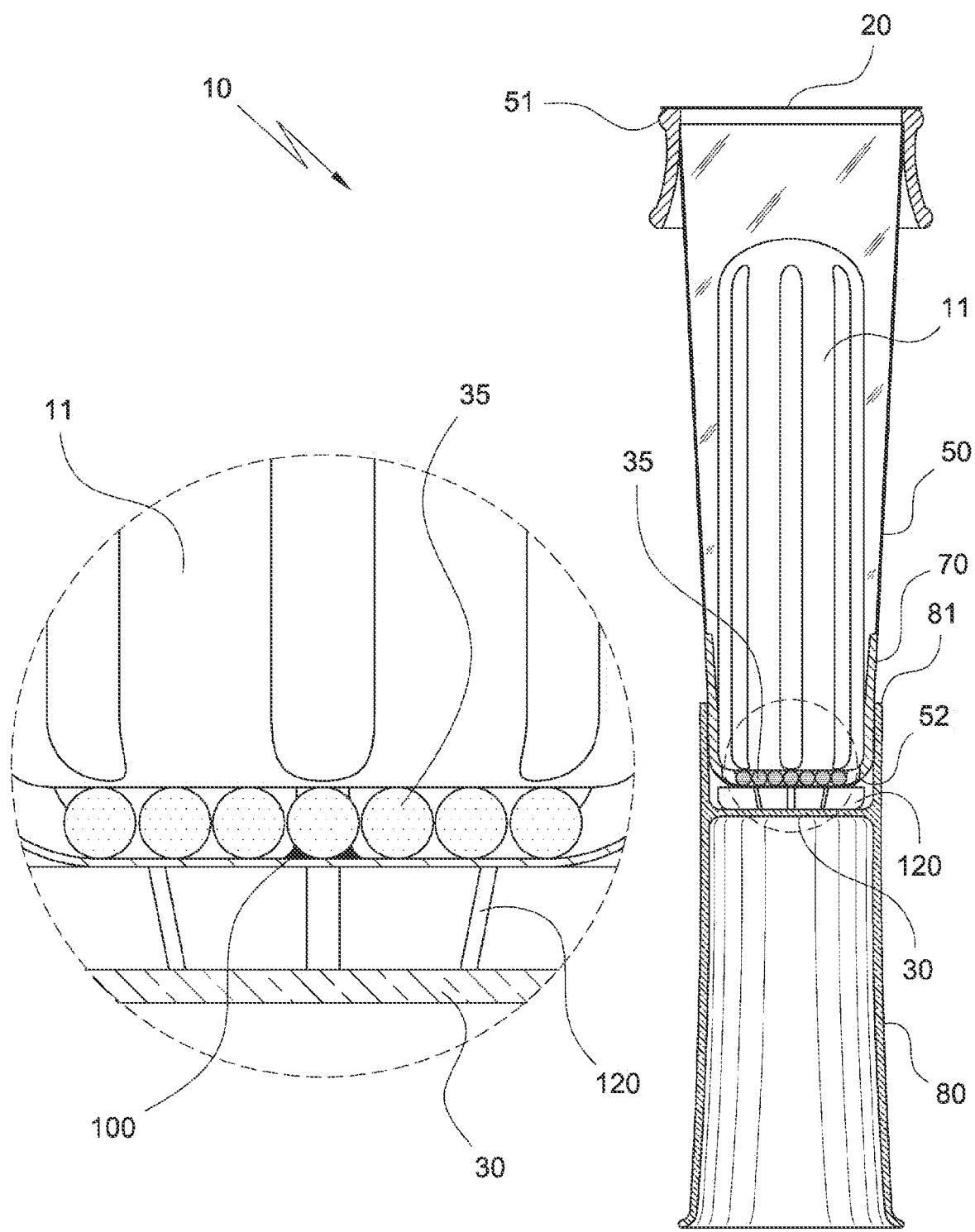
FIG. 13 is a sagittal section of the delivery device according to one embodiment, wherein the insertable is a tampon with a withdrawal cord member. Also depicted is a blowup view of the area of the delivery device encircled by dotted line.
Figure 14:
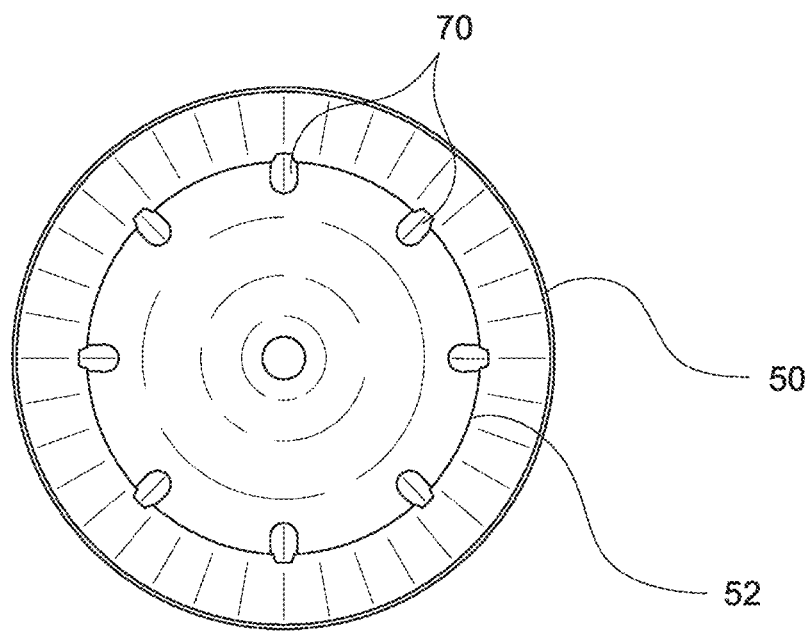
FIG. 14 is a top view illustrating features of one embodiment of the insertable orientation means proximal end.
Figure 15:
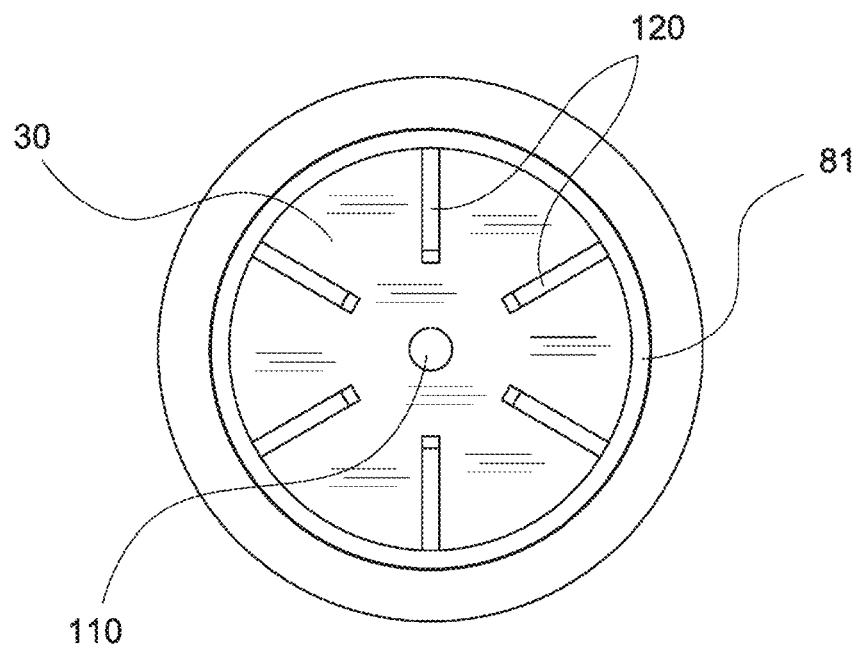
FIG. 15 is a top view illustrating features of one embodiment of the digit orientation means distal end.

The delivery device of some preferred embodiments is formed as a single piece (as particularly illustrated in FIGS. 1 through 4), and of some other preferred embodiments is formed as two pieces (as particularly illustrated in FIGS. 5, 6, 8 and 13), wherein a first piece comprises the insertable orientation means 12 and the second piece comprises the digit orientation means 17.

Where the delivery device is comprised of at least two pieces, as illustrated by FIG. 13 the proximal end 52 of the insertable orientation means 50 fittingly engages with a distal end 81 of the digit orientation means 80. A plurality of rib members or teeth members 120 are equally spaced apart along a perimeter of an inner side of the distal end 81 of the digit orientation means 80. This embodiment is well illustrated in FIGS. 13 and 15. In some such embodiments, the insertable orientation means 50 is adapted for releasable engagement with the digit orientation means 80.

Materials for the manufacture of preferred embodiments of the delivery device are selected such that they exhibit one or more of the following properties: medical grade, mouldable, invertible including invertible without split, non-porous, flexible, resilient, durable, stable at room and transport temperatures, water-soluble, rapidly biodegradable, nonallergenic, approved by therapeutic regulators for medical or ingested drug delivery, and having a shelf-life that exceeds 2 years, more preferably 3 years, and more preferably still, 5 years, when stored according to storage instructions. In some preferred embodiments, another characteristic for the materials is that they do not decompose or melt when the delivery device is in direct sunlight or in a location where the temperature exceeds normal room temperature.

The delivery device of preferred and alternative embodiments is adapted to deploy various kinds of insertables. In some such embodiments, the insertable is a tampon, pessary, suppository, clinical screening device, swab, cream, lubricant, pellet, tablet, capsule, supplement, implantable, medical or surgical device, therapeutic, or other insertable adapted to be of therapeutic or diagnostic benefit. In yet still further embodiments, the insertable may be an active or passive implantable or a device such as a sensor for monitoring, alerting, recording or communicating data recorded from within the orifice, such as biological data, or an implantable therapeutic device for ongoing treatment or medical intervention as required.

In a particularly preferred embodiment, the insertable is a tampon.

Where the tampon 11 is positioned in the insertable orientation means 50 during manufacture, a proximal end of the tampon 11 is engaged with the proximal end of the insertable orientation means 50. A withdrawal cord member 35 typically extends from a distal end of the tampon 11.

The withdrawal cord member 35 is typically interwoven with the material from which a body of the tampon 11 is formed, or otherwise substantially unreleasably connected to a body of the tampon 11, preferably adjacent the tampon 11 proximal end 36. In particularly preferred embodiments the withdrawal cord member 35 is inter-engaged with the body of the tampon 11 and is adapted for withdrawal of the deployed tampon 11 from the vaginal cavity when desired. Preferably, the withdrawal cord member 35 extends from a distal end, engaged with the tampon body, to a proximal end, the withdrawal cord member 35 proximal end being adapted to be held by a user.

As is illustrated by FIGS. 2 to 4, 6, 12 and 17, where an orifice 110 penetrates the partition 30 there is fluid communication between the insertable orientation means 50 and the digit orientation means 80. The penetrating orifice 110 is adapted to accommodate a cross-section of a withdrawal cord member 35.

Figure 4:
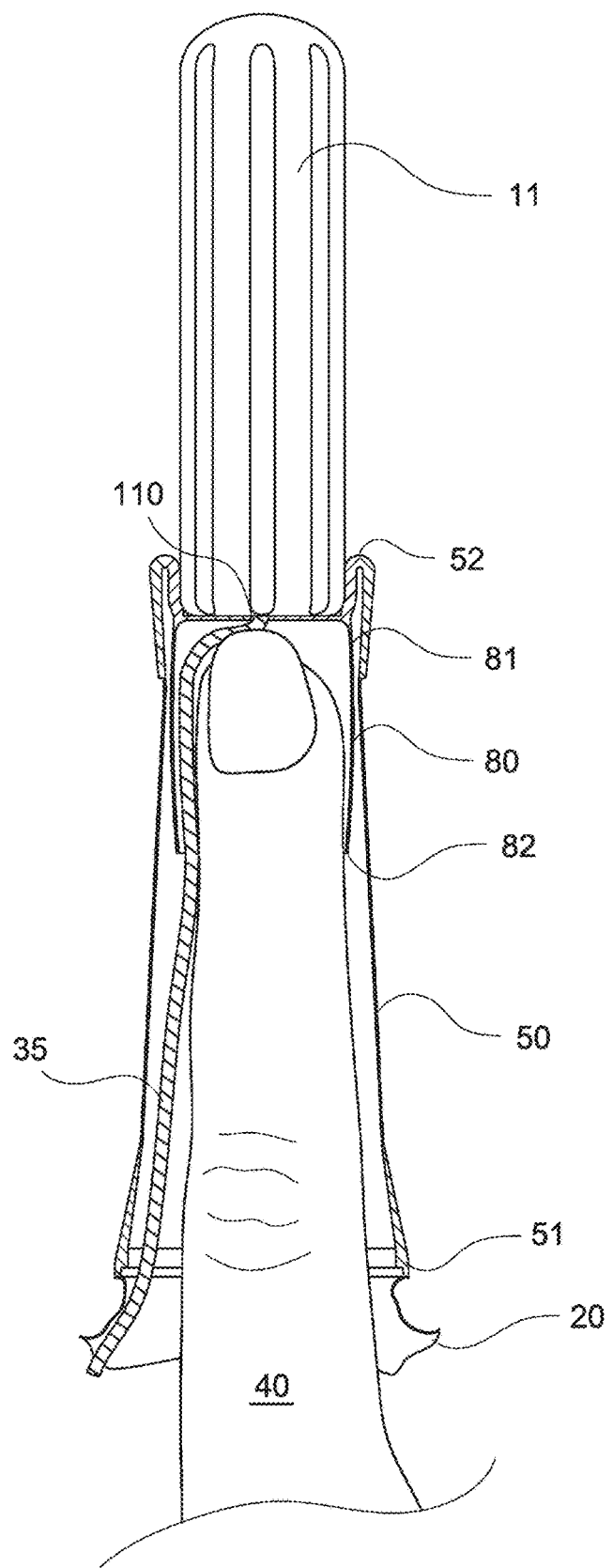
FIG. 4 is a side view of the delivery device according to the embodiment depicted in FIG. 1, wherein a portion of one digit is inserted in the digit orientation means, and the insertable orientation means sheath has been changed from the housing configuration to the insertable exposing configuration.

The withdrawal cord member 35 passes through the penetrating orifice 110 and extending from engagement of the withdrawal cord member 35 distal end with the proximal end 36 of the tampon 11 to the withdrawal cord member 35 proximal end. The withdrawal cord member proximal end is in a freely movable orientation within the digit orientation means 80, 17. When a user inserts a distal portion of one or more of her digits 40 into the digit orientation means 80, 17, the withdrawal cord member 35 proximal end is preferably compressed between a side of the digit 40 and an inner wall of the digit orientation means 80. This is shown in FIGS. 4, 12, and 17.

Following deployment of the tampon 11 into the vaginal cavity, the device 10 is withdrawn and the withdrawal cord member 35 proximal end slides through the penetration orifice 110 until the withdrawal cord member 35 proximal end is in a freely movable orientation external to the vaginal orifice.

As is shown in FIG. 13, where there is no penetrating orifice in the partition 30 and wherein the tampon 11 includes a withdrawal cord member 35, a proximal end of the withdrawal cord member 35 is affixed to a distal surface of the partition 30 by a releasable affixture 100.

A balance of withdrawal cord member 35 is then configured in a concentric circular wind configuration such that a length of the withdrawal cord member is accommodated by the proximal end 52 of the insertable orientation means 50 interposed between a proximal end 36 of the body of the tampon 11 and the partition 30. The blowup of the encircled portion of FIG. 13 illustrates a sagittal view of the concentric circular wind configuration of the withdrawal cord member 35 as described here, including the releasable affixture 100.

The following description concerns itself particularly with FIGS. 5 to 12. A hygienic insertable device is generally depicted as 10 in the accompanying drawings.

The embodiments described herein relate to the insertion of a tampon to be typically worn and used by women during their menstrual period to absorb menstrual fluid and the like. In this regard, the insertion item comprises a tampon 11 that extends from a first end of a flexible sleeve 12 to a second end. However, it will be appreciated that the tampon 11 may also comprise a suppository, a pessary or other like member that requires insertion into a bodily orifice and the present invention is not limited to the exemplary embodiment depicted in the drawings.

Figure 5:
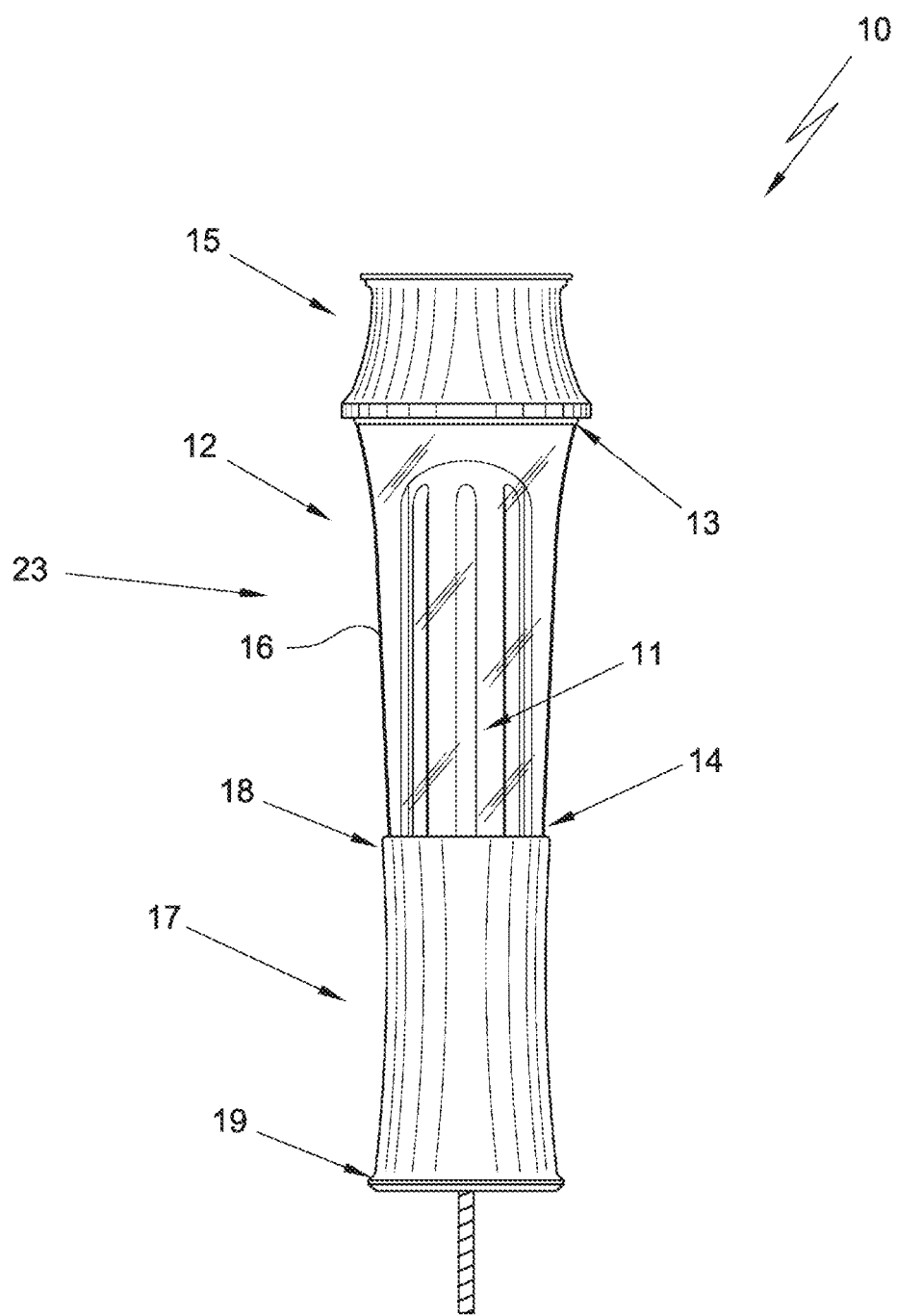
FIG. 5 is a front view of the delivery device according to one embodiment of the invention with a tampon housed in the insertable orientation means.

FIG. 5 depicts a further preferred embodiment of the insertable device 10 that is suitable for deploying an item by hygienic digital insertion into an orifice. As shown in FIG. 5, the insertable device 10 for hygienic digital insertion of a tampon 11 comprises a flexible sleeve 12 comprising a first end 13 and a second end 14, wherein a rigid portion 15 is attached to a first end 13 of the flexible sleeve 12 and a thin membrane cover 16 is formed between the first end 13 and a second end 14 of the flexible sleeve 12.

A rigid elongate digit cover 17 is designed to accommodate the finger of a user and is attached to the second end 14 of the flexible sleeve 12. Anthropometric measurements are preferably used in the design of the rigid elongate digit cover 17 in order to accommodate for the majority of female index finger sizes (females between 16-65 years of age). The digit cover 17 comprises a first end 18 and a second end 19. In this embodiment, the tampon 11 is releasably secured to the first end 18 of the rigid elongate digit cover 17.

Figure 6:
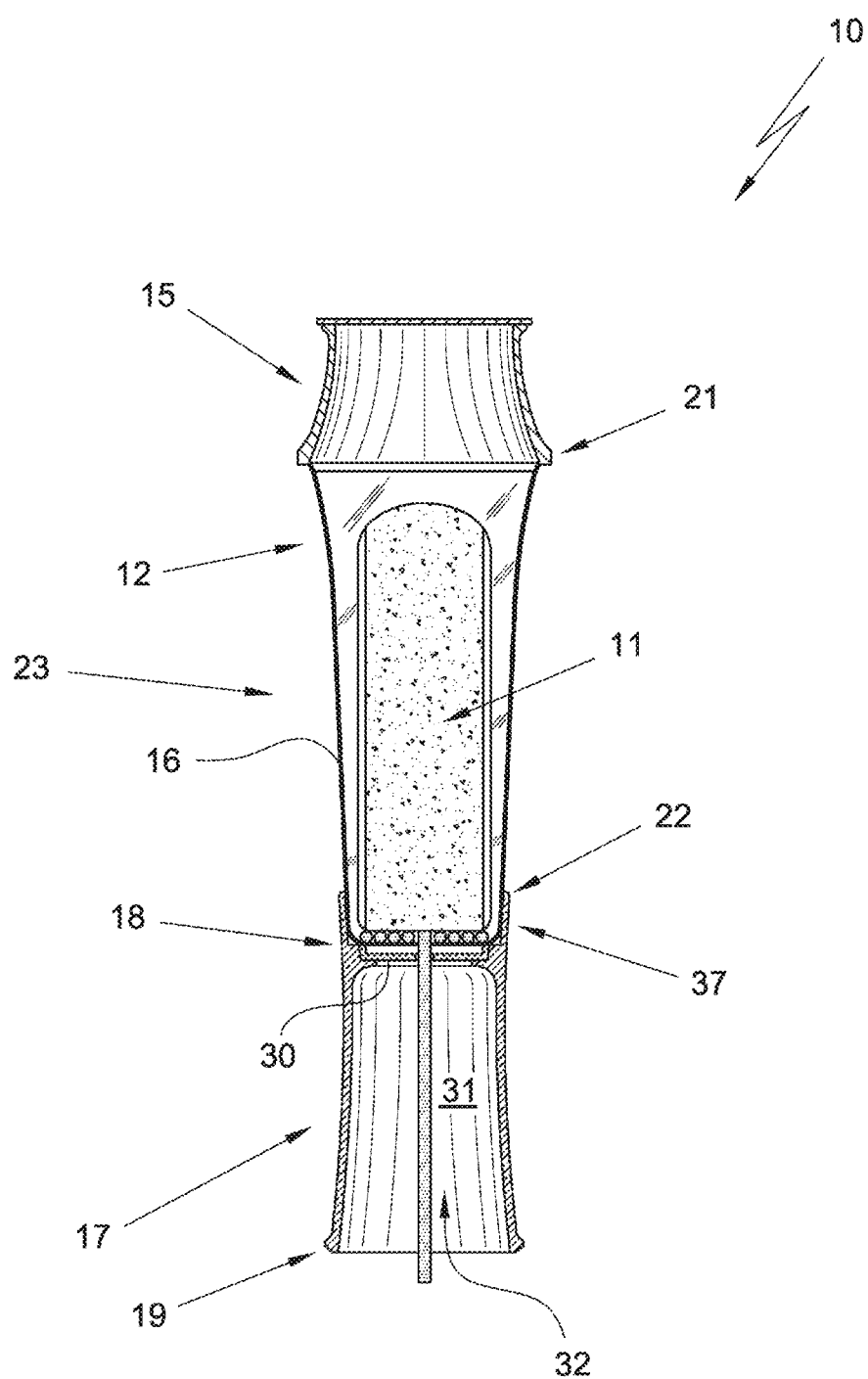
FIG. 6 is a cutaway front view of the embodiment of the device depicted in FIG. 5 with the flexible sleeve in the first configuration before reveal of a tampon.
Figure 7:
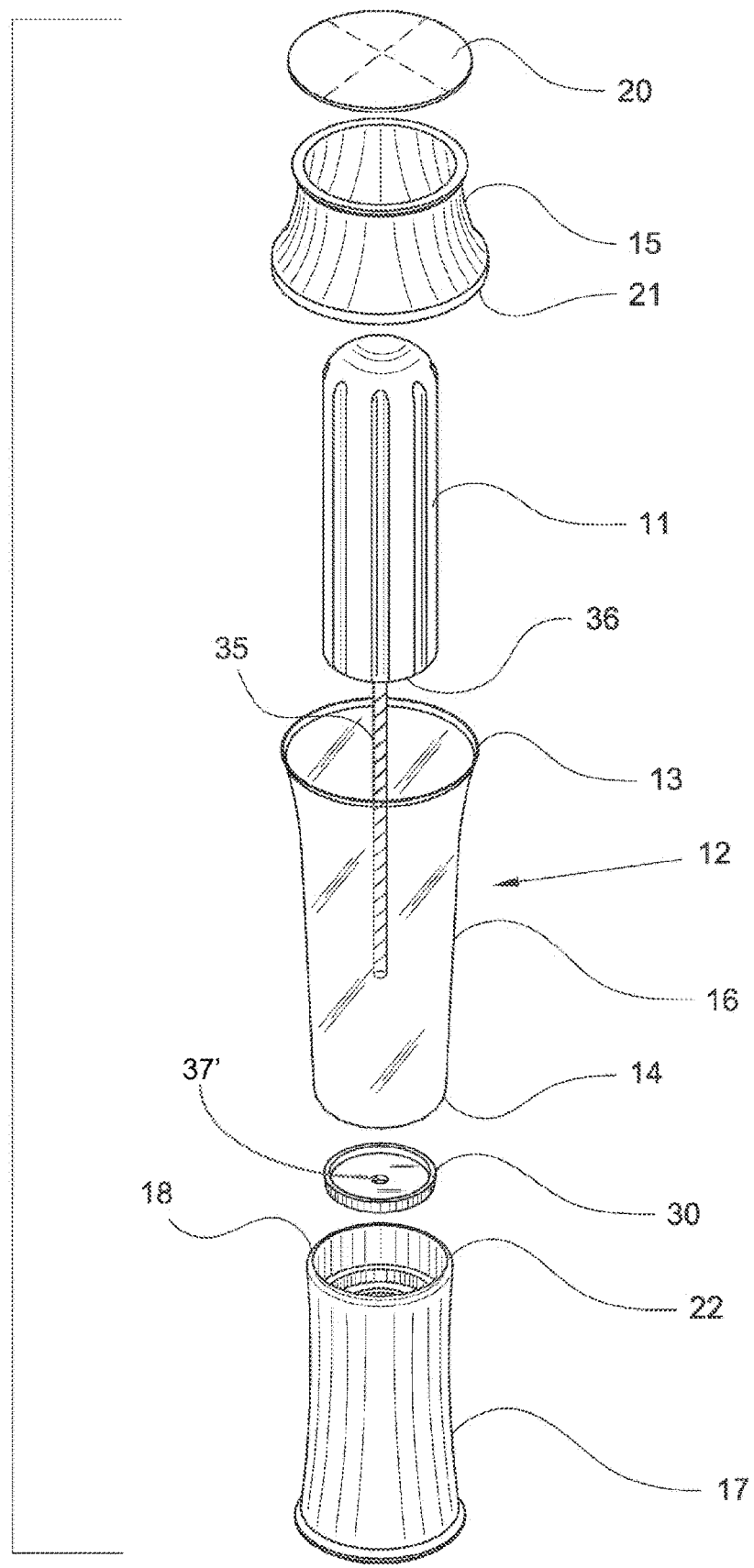
FIG. 7 is an exploded perspective view of the embodiment of the device depicted in FIG. 5.

As shown in FIG. 7, an internal rigid support 30 adjacent the second end 14 of the flexible sleeve 12 is attached to the first end 18 of the rigid elongate digit cover 17 wherein the internal rigid support 30 holds the tampon 11 to be digitally inserted. As shown in FIG. 5 and FIG. 6, the tampon 11 is covered by the thin membrane 16 of the flexible sleeve 12. The thin membrane 16 is sandwiched between the rigid elongate digit cover 17 and the internal rigid support 30 such that the thin membrane 16 is bonded at both sides of the device 10. The internal surface 31 at the first end 18 of the rigid elongate digit cover 17 comprises a tapered configuration 32 to accommodate for a variety of digit sizes.

As shown in FIGS. 5, 6 and 12, the insertable device 10 comprises a first inflection point 21 and a second inflection point 22 such that the flexible sleeve 12 is movable between a first configuration 23 adapted to cover the tampon 11 and a retracted second configuration 24 (as shown in FIG. 12, particularly illustration (c)) adapted to uncover the tampon 11. The rigid portion 15 is shown in FIG. 12 illustration (b) as sitting adjacent the first end 18 of the rigid elongate digit cover 17. As shown in FIG. 12 illustration (c) the rigid portion 15 and the thin membrane cover 16 can be moved further along the surface of the rigid elongate digit cover 17. The rigid elongate digital cover 17 may include shorter or longer lengths in different embodiments and the rigid portion 15 and the thin membrane cover 16 may be moved to extend beyond the second end 19 of the rigid elongate digit cover 17.

Figure 8:
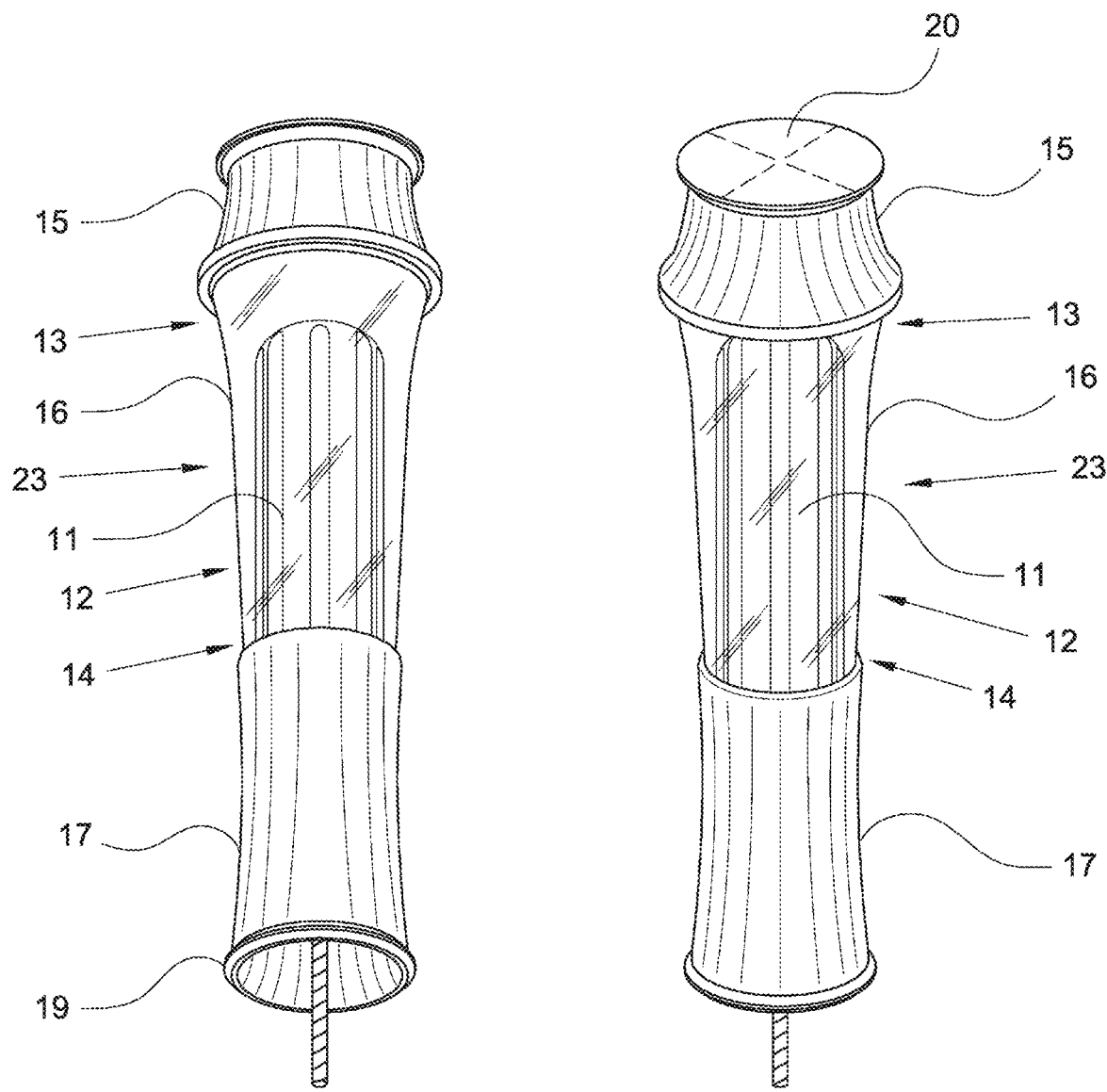
FIG. 8 provides two alternative perspective views of the embodiment of the device depicted in FIG. 5.
Figure 10:
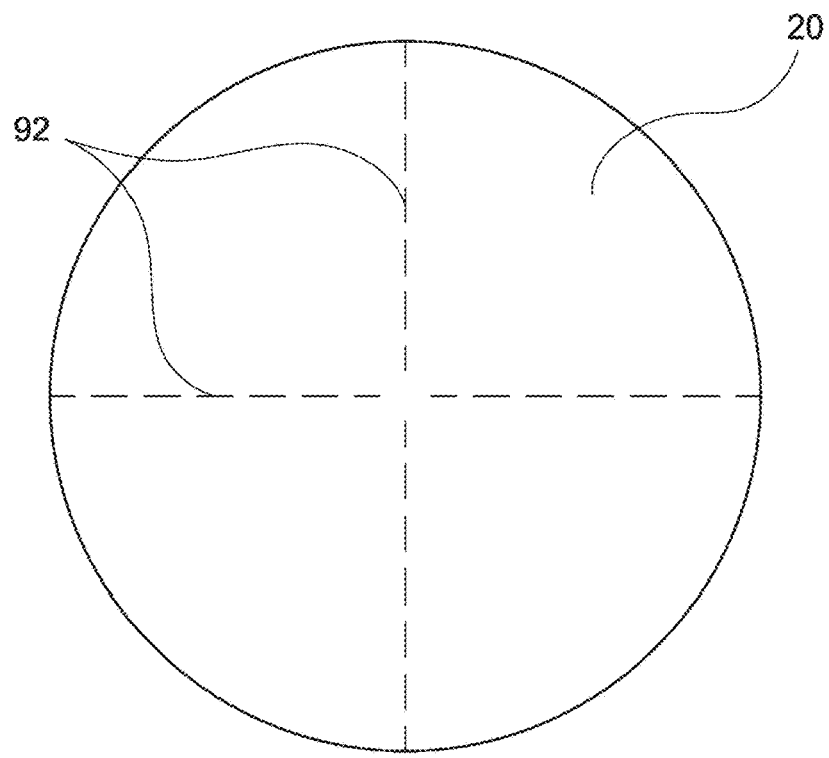
FIG. 10 is a top view of one embodiment of the orifice facing member.

As shown in FIG. 8, the tampon 11 is hermetically sealed within the flexible sleeve 12. As shown in FIG. 12 illustration (a), the tampon 11 breaks through the hermetic seal 50 upon application of force from an inserted digit covered by the rigid elongate digit cover 17. In some such preferred embodiments, the breaking through of the seal is further facilitated by a user moving rigid portion 15 in the direction of the rigid elongate digit cover 17. The material that is used to form the thin membrane 16 of the flexible sleeve 12 is a soft film including a frangible zone 20, as also shown in FIG. 10, to break through the hermetic seal but comprises sufficient strength such that it is able to protect and cover the tampon and maintain the hermetic seal until the tampon 11 is ready for insertion.

The result of this application of force by an inserted digit is shown in FIG. 12 illustration (a). At the first end 18 of the rigid elongate digit cover 17, and adjacent the second end 14 of the flexible sleeve 12 and the internal rigid support 30, is a rigid surface when the flexible sleeve 12 is movable from the first configuration 23, as the rigid portion 15 is moved towards the second end 14 of flexible sleeve 12 such that thin membrane 16 is collapsible in layers upon itself. As shown in FIG. 12 illustration (c) the flexible sleeve 12 inverts at the second inflection point 22 such that the thin membrane 16 is inverted sheathing the rigid elongate digit cover 17 as the rigid portion 15 is moved along the rigid elongate digit cover 17 from the first end 18 towards the second end 19 of the rigid elongate digit cover 17. Therefore, the finger of a user does not come into contact with the tampon 11 during insertion thereof. If required, the rigid portion 15 can be moved back along from the second end 19 towards the first end 18 of the rigid elongate digit cover 17 and the inversion of the thin membrane 16 can be reversed to function as a receptacle for blood waste and the like.

The inclusion of the first inflection point 21 and the second inflection point 22 enable the flexible sleeve 12 to both collapse in stable layers as the rigid portion 15 is moved towards the second end 14 of flexible sleeve 12 and then subsequently invert and extend in a stable manner to provide a sheath over the surface 34 of the rigid elongate digit cover 17.

Figure 9:
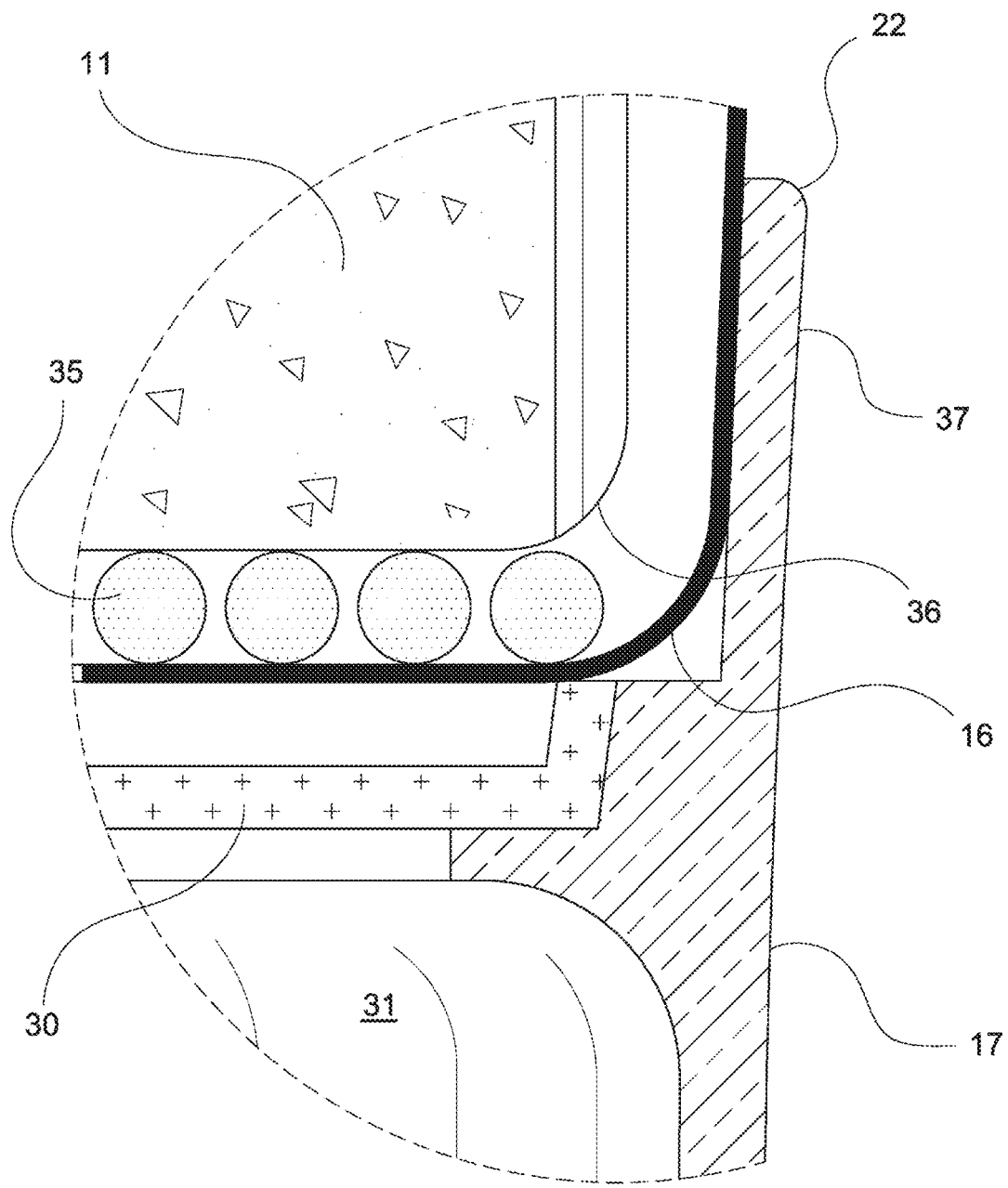
FIG. 9 is a cutaway view of the embodiment of the device depicted in FIG. 5 showing the location of the removal cord of the tampon prior to deployment of the tampon.

As shown in sequential illustrations (a) to (d) in FIG. 12, in normal use, when the tampon 11 is unwrapped from its packaging, a removal cord or string 35 is positioned adjacent the proximal end 36 of the tampon 11. When required for use, the removal cord or string 35 can be pulled away from the tampon 11 to an extended position. The tampon rests within a lip 37 located at the first end 18 of the rigid elongate digit cover 17. This is shown, for example, in FIG. 6, FIG. 9 and FIG. 12. When the tampon is inserted into the vagina of a user, the removal cord or string 35 has sufficient length to extend from the tampon 11 and from the vagina such that it may be gripped by a user. Also shown in FIGS. 6, 9 and 12, the tampon 11 comprises a removal cord or string 35 attached to the tampon 11 that can pass through an opening 37' in the internal rigid support 30. This removal cord or string 35 is passed through an opening in the internal rigid support 30 and, as shown in FIG. 6 and FIG. 9, positioned between the internal rigid support 30 and the first end 18 of the rigid elongate digit cover 17. As illustrated in FIG. 9, when removal cord or string 35 is positioned between the internal rigid support 30 and the first end 18 of the rigid elongate digit cover 17, in some embodiments, it can be wound into a coil-like roll. As illustrated in FIG. 12, the internal rigid support 30 acts to assist in unwinding the cord 35 as the tampon is pulled out.

As shown in successive illustrations (a) to (c) in FIG. 12, the thin membrane 16 collapses upon itself from the first inflection point 21 down to the second inflection point 22. Force is then applied from the finger or digit 40 of a user and the flexible sleeve 12 is shown to invert and sheath the rigid elongate digit cover 17. Illustration (d) in FIG. 12 shows insertable device 10 in the configuration following the tampon 11 having been inserted into the vagina. The tampon 11 is secure in the vagina and the insertable device 10 is withdrawn with removal cord or string 35 passing through the opening in the internal rigid support on finger or digit 40 of the user.

In practical terms, the hermetic seal 20 can be broken by sliding down the side of the rigid portion 15 to reveal the tampon 11, for example, for inspection just prior to insertion and, in any event, for deployment. The sheath created by thin membrane 16 will further slide down over the finger or digit 40 of a user. This fully reveals the tampon 11, which rests securely in the lip 37 on lop of the rigid elongate digit cover 17. Ergonomically, the user can easily feel when the tampon 11 passes the external os of the vagina for effective placement inside the vagina. The invention of several preferred embodiments, therefore, advantageously incorporates placement of the insertion device 10 on the finger or digit 40 of a user, and hygienic reveal of a tampon 11 with no contact from the finger or digit 40 of a user. The finger or digit 40 thus becomes, in several preferred embodiments, the applicator. The device 10 can readily be used with variable anatomy in a more intimate and less invasive approach.

It will be appreciated that insertion of a tampon 11 using the insertable device 10 can provide two-way biological hazard protection. First, the tampon 11 is protected from contamination by the fingers of the user. This reduces excess introduction of pathogens into the vagina. Secondly, the user avoids becoming exposed to blood and biological fluids as the tampon is inserted, which blood and biological fluids can then be transferred elsewhere, such as to external surrounding surfaces.

The insertable device 10 of some preferred embodiments is typically made from a water-dissolvable material such as polyvinyl alcohol. This enables the insertable device 10 to be safely dissolvable and flushable for disposal inhibiting excess environmental impact, as well as being less of a biological hazard as the waste blood and fluids are discreetly and easily disposed of without contacting other surfaces.

The materials from which the device 10 of the present invention can be formed is discussed in detail elsewhere in the specification.

In some specific embodiments, the following materials may be used in the manufacture of elongate digit cover 17 and of the rigid portion 15:

a polyalkene, such as polypropylene (PP) and polyethylene (PE). The polyalkene can be high molecular weight or low molecular weight. The polyalkene can be "oxo-biodegradable" by being manufactured from a polyethylene incorporating an additive which causes degradation and then biodegradation of the polymer (polyethylene) due to oxidation;

thermoplastic elastomers such as thermoplastic polyurethane or elastic rubber. The thermoplastic polyurethane can be biodegradable, where at least one component of alternating sequences of hard and soft segments is biodegradable;

elastic rubber. The rubber or silicone rubber can be synthetic or natural. The rubber can be biodegradable. The rubber can be copolymerised by bioplastics such as polylactic acid, polyglycolic acid, or Poly(3-hydroxybutyrate-co-3-hydroxyvalerate) or PHBV; or bioplastic elastomers verified to meet U.S. (ASTM D6400-04) and E.U. (EN 13432). The rubber can be a biodegradable rubber by crosslinking poly(hydroxyalkanoate) or polyesters.

In some of the same specific embodiments and in others, the materials from which the thin membrane cover 16 may be manufactured can be selected from six generic classes of commercial TPEs (designations acc. to ISO 18064), specifically:

Styrenic block copolymers, TPS (TPE-s);
Thermoplastic polyolefin elastomers, TPO (TPE-o);
Thermoplastic Vulcanizates, TPV (TPE-v or TPV);
Thermoplastic polyurethanes, TPU (TPU);
Thermoplastic co-polyester, TPC (TPE-E); and
Thermoplastic polyamides, TPA (TPE-A).

In some of the same specific embodiments and in others, the following materials may be used in the manufacture of soft film 20:

a thin layer of polyalkene such as polypropylene (PP) and polyethylene (PE). The polyalkene can be high molecular weight or low molecular weight;

linear low-density polyethylene (LLDPE);

Polyamides. The polyamide can be natural or synthetic. The polyamide can be aliphatic such as Nylon 6.

In some preferred embodiments, the materials from which the device 10 is manufactured are flushable materials. According to INDA/EDANA Guidance Document, flushable materials can be selected from: polyvinyl alcohol resin with a filling agent, a natural polymer material such as carbohydrate, e.g. starch or cellulose, and a plasticizer such as polyols, e.g. glycerol or sorbitol. The polyvinyl alcohol resin raw material may consist of a low alcoholized degree polyvinyl alcohol resin having an alcoholized degree of about 80 mol % to 93 mol % and a high alcoholized degree polyvinyl alcohol resin having an alcoholized degree of about 93.1 mol % to 99.99 mol %, and the ratio of the low alcoholized degree polyvinyl alcohol resin to the high alcoholized degree polyvinyl alcohol resin is from about 90:10 to 0:100 (w/w).

Also disclosed is a method for deploying an insertable 11 into an orifice guided by digit 40, the method comprising:

a. providing a delivery device 10 wherein the insertable 11 is temporarily accommodated in a deployment orientation 24;

b. inserting a portion of at least one digit 40 into the digit orientation means 80 in a navigation orientation;

c. optionally exposing the insertable;

d. using the digit 40, guiding deployment of the insertable 11 into the orifice from a distal end of the insertable 11 to a proximal end of the insertable 11; and e. withdrawing the delivery device 10, leaving the insertable 11 deployed in the orifice.

The step of inserting a portion of at least one digit 40 into the digit orientation means 80 includes adjusting the positioning of the portion of the at least one digit 40 until the portion of the at least one digit 40 is in the navigation orientation.

For example, in some embodiments, the insertable 11 is a tampon having a withdrawal cord member 35 which extends from a proximal portion 36 of a body of the tampon 11 and a penetration orifice 110 adapted to accommodate a cross-section of the withdrawal cord member 35 is formed in the partition 30 across which the insertable orientation means 50 and the digit orientation means 80 are adjoined. A proximal end of the withdrawal cord member 35 is in a freely movable configuration within the digit orientation means 80. When a portion of the least one digit 40 is inserted into the digit orientation means 80, the withdrawal cord member 35 proximal end is compressingly maintained between a side of the portion of the at least one digit 40 and an inner wall of the digit orientation means 80. This is well illustrated in FIGS. 4, 12 and 17.

The step of exposing the insertable 11 occurs when the insertable orientation means 50 further comprises a sheath member 16 and the insertable 11 is temporarily accommodated in the deployment orientation of second configuration 24 within a surrounding configuration of an inner surface of a sheath member 16. The step of exposing also occurs when the insertable orientation means 50 further comprises an orifice facing member 20 adapted to substantially cover a distal end 13 of the sheath member 16 such that the insertable 11 in the deployment orientation of second configuration 24 is in a housed configuration interposed between a proximal portion 52 of the insertable orientation means 50 and the orifice facing member 20. This is well illustrated in FIGS. 8, 13, 16 and 17.

The step of exposing the insertable occurs when a distal end of the insertable orientation means 50 is moved in a direction of a proximal end of the insertable orientation means 50. The insertable 11 will be gradually exposed during movement of the insertable orientation distal end 51 in the direction of the insertable orientation proximal end 52, until the sheath member 16 is in the insertable exposing second configuration 24.

When the sheath member 16 is in the insertable exposing second configuration 24, an outer surface of the sheath member covers at least the insertable orientation means proximal end 52, 14, the partition 30, and a distal end 81 of the digit orientation means 80, 17. According to some such embodiments, the sheath member 16 outer surface further covers at least a portion of the digit 40, thereby acting as a glove-like member. This is illustrated, for example, in FIG. 4.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It is to be noted that, throughout the description and claims of this specification, the word "comprise" and variations of the word, such as "comprising" and "comprises," is not intended to exclude other variants or additional components, integers or steps. Modifications and improvements to the invention will be readily apparent to those skilled in the art. Such modifications and improvements are intended to be within the scope of this invention.

The invention claimed is:

1. A delivery device for deploying an insertable into an orifice guided by digit, the delivery device comprising:
   a. an insertable orientation tubular structure adapted to orient the insertable in a deployment orientation; and
   b. a digit orientation tubular structure adapted to orient a portion of at least one digit in a navigation orientation, the insertable orientation tubular structure and the digit orientation tubular structure adjoined across a partition with a partition cross-section, and the deployment orientation and the navigation orientation arranged for digit guided deployment of the insertable into the orifice;
   wherein the insertable orientation tubular structure further comprises a sheath member with proximal and distal ends defining a sheath member length and having a sheath member thickness defined by inner and outer surfaces, the sheath member extends distally from, or adjacent, the insertable orientation tubular structure proximal portion such that the sheath member inner surface substantially surrounds the insertable in a surrounding configuration.

2. The delivery device of claim 1, wherein the insertable orientation tubular structure further comprises a proximal portion adjacent the partition, the proximal portion adapted to temporarily accommodate at least a portion of the insertable.

3. The delivery device of claim 2, wherein the partition is formed of any one or more of: the insertable orientation tubular structure proximal portion, the distal portion of the digit orientation tubular structure, or a partition member.

4. The delivery device of claim 1, wherein the insertable orientation tubular structure further comprises an orifice facing member with a thickness and a perimeter defining an orifice facing member surface area and having a radial perimeter width interposed between the perimeter and an inner side of the radial perimeter width, the orifice facing member adapted to substantially cover the sheath member distal end such that the insertable in the deployment orientation is in a housed configuration interposed between the insertable orientation tubular structure proximal portion and the orifice facing member.

5. The delivery device of claim 4, wherein the orifice facing member is adapted to removably engage the sheath member distal end, the removable engagement comprising a frangible join of the orifice facing member perimeter and a perimeter of the inner surface of the sheath member adjacent a distal end of the sheath member and adapted to permit forced disengagement along at least a portion of the frangible join.

6. The delivery device of claim 4, wherein at least one fragility element spans at least a portion of the orifice facing member thickness, the fragility element adapted to permit forced penetration of the orifice facing member.

7. The delivery device of claim 4, wherein the orifice facing member radial perimeter width has a region structural resilience and the sheath member has a sheath structural resilience, and a soft resilience measure of the region structural resilience exceeds the soft resilience measure of the sheath structural resilience.

8. The delivery device of claim 4, wherein the sheath member is adapted to have a tapered configuration along the sheath member length from substantially widest at the sheath member distal end to substantially narrowest at the sheath member proximal end.

9. The delivery device of claim 4, wherein the sheath member thickness is adapted to accommodate a change in the sheath member from the surrounding configuration to an insertable exposing configuration, wherein the sheath member distal end is extended beyond the sheath member proximal end, the partition, and at least a portion of the digit orientation tubular structure.

10. The delivery device of claim 9, wherein as the sheath member is changed from the surrounding configuration to the insertable exposing configuration, the sheath member inner surface is increasingly exposed and the sheath member outer surface is increasingly covered.

11. The delivery device of claim 9, wherein movement of the sheath member distal end in the direction of the sheath member proximal end causes a distal portion of the insertable to apply increasing pressure to the orifice facing member until the orifice facing member is forcibly disengaged from the sheath member distal end, and/or at least one fragility element is forcibly penetrated, allowing the insertable distal end to be exposed from within the surrounding configuration.

12. The delivery device of claim 1, wherein the digit orientation tubular structure further comprises a distal portion adjacent the partition, the digit orientation tubular structure distal portion adapted to fittingly maintain the portion of the at least one digit in the navigation orientation.

13. The delivery device of claim 1, wherein the navigation orientation is an orientation in which the portion of the at least one digit is oriented for application of at least one directional force to the insertable in the deployment orientation for deployment through physical structures defining the orifice.

14. The delivery device of claim 1, wherein the deployment orientation has a longitudinal axis and the navigation orientation has a longitudinal axis and the arrangement of the deployment orientation and the navigation orientation is such that the deployment orientation longitudinal axis and the navigation orientation longitudinal axis are substantially parallel, substantially aligned, or intersect at an angle adapted to facilitate deployment of the insertable into the orifice.

15. The delivery device of claim 1, adapted so that advancement of the insertable through physical structures defining the orifice transmits proprioceptive cues through the partition to the portion of the at least one digit enabling informed selection of a directional force or forces necessary to navigate the insertable through physical structures defining the orifice and/or into the orifice.

16. The delivery device of claim 1, formed as two pieces, wherein a first piece comprises the insertable orientation tubular structure and a second piece comprises the digit orientation tubular structure.

17. The delivery device of claim 1, wherein the orifice is an opening into a vagina, an opening into an anus, an opening into a urinary tract, an opening into a penis, a nostril, an opening into an ear, and a mouth.

18. The delivery device of claim 1, wherein the insertable is a tampon, pessary, suppository, clinical screening device, swab, cream, lubricant, pellet, tablet, capsule, supplement, implantable, medical or surgical device, therapeutic, or other insertable adapted to be of therapeutic or diagnostic benefit.

19. A method for deploying an insertable into an orifice guided by digit, the method comprising:
providing a delivery device according to claim 1;
wherein the insertable is temporarily accommodated in a deployment orientation;
inserting a portion of at least one digit into the digit orientation tubular structure in a navigation orientation;
using the digit, guiding deployment of the insertable into the orifice from a distal end of the insertable to a proximal end of the insertable; and
withdrawing the delivery device,
leaving the insertable deployed in the orifice.

20. The method of claim 19, further comprising exposing the insertable after inserting the portion of the at least one digit into the digit orientation tubular structure and before the guiding deployment of the insertable into the orifice.

* * * * *